US012219949B2

United States Patent
Kletzli et al.

(10) Patent No.: US 12,219,949 B2
(45) Date of Patent: Feb. 11, 2025

(54) ELECTRONIC RODENT TRAP WITH REMOTE MONITORING CAPABILITY

(71) Applicant: Woodstream Corporation, Lancaster, PA (US)

(72) Inventors: Paul Kletzli, Akron, PA (US); Mark Ebner, Davenport, FL (US); Cory Blair, Lehighton, PA (US); Peter Koziar, Jr., Lititz, PA (US)

(73) Assignee: Woodstream Corporation, Lancaster, PA (US)

( * ) Notice: Subject to any disclaimer, the term of this patent is extended or adjusted under 35 U.S.C. 154(b) by 441 days.

(21) Appl. No.: 17/551,739

(22) Filed: Dec. 15, 2021

(65) Prior Publication Data

US 2022/0104476 A1 Apr. 7, 2022

Related U.S. Application Data

(63) Continuation of application No. 15/894,669, filed on Feb. 12, 2018, now Pat. No. 11,219,204.

(51) Int. Cl.
*A01M 23/38* (2006.01)
*A01M 31/00* (2006.01)

(52) U.S. Cl.
CPC .......... *A01M 23/38* (2013.01); *A01M 31/002* (2013.01); *A01M 2200/00* (2013.01)

(58) Field of Classification Search
CPC .... A01M 31/002; A01M 23/00; A01M 23/38; A01M 23/02; A01M 25/004;

(Continued)

(56) References Cited

U.S. PATENT DOCUMENTS

| | | | | |
|---|---|---|---|---|
| 1,045,584 A | * | 11/1912 | Mock | A01M 23/38 |
| | | | | 43/99 |
| 1,727,325 A | * | 9/1929 | Bilinski | A01M 23/00 |
| | | | | 43/79 |

(Continued)

FOREIGN PATENT DOCUMENTS

| CN | 101516184 A | 8/2009 |
|---|---|---|
| JP | 69784 | 5/1925 |

(Continued)

OTHER PUBLICATIONS

PCT International Search Report and Written Opinion, Application No. PCT/US2020/046279, Dated: Feb. 8, 2022, 9 pages.

(Continued)

*Primary Examiner* — Jeffrey R Larsen
(74) *Attorney, Agent, or Firm* — Barley Snyder

(57) ABSTRACT

An electronic rodent trap and monitoring method is provided. Each trap has at least one entrance, and preferably two entrances in opposed relationship to create a longitudinal tunnel, with a pair of lower plates extending longitudinally and oriented in spaced substantially parallel relationship, and a triggering element, such as a third plate, positioned above the lower plates, and preferably adjacent the ceiling of the trap on a center baffle that also shields a bait cup. The trap is activated when the rodent, with its left and right feet on the parallel lower plates, which are preferably raised above the floor, contacts the triggering element on the center baffle. The trap is preferably modular in design with an electronics module and a tunnel module removably secured within and protected by an outer housing. The trap also has improved features for more accurate remote monitoring of rodent dispatch and kill verification.

20 Claims, 16 Drawing Sheets

(58) Field of Classification Search
CPC ...... A01M 29/24; A01M 19/00; A01M 23/16; A22B 3/06; H05C 1/04; H05C 1/06; H05C 1/02; Y10S 119/908
USPC .................................................. 43/98, 112
See application file for complete search history.

(56) References Cited

U.S. PATENT DOCUMENTS

| | | | |
|---|---|---|---|
| 2,420,723 A | 5/1947 | Ratchford | |
| 2,677,209 A * | 5/1954 | Hutchison, Sr. ...... | A01M 23/38 43/99 |
| 2,722,036 A | 11/1955 | Servidio | |
| 3,468,054 A * | 9/1969 | Levine .................. | A01M 23/38 43/98 |
| 4,497,130 A | 2/1985 | Fitzgerald | |
| 4,648,201 A * | 3/1987 | Sherman ............. | A01M 25/004 43/131 |
| 4,780,985 A | 11/1988 | Coots | |
| 5,746,020 A | 5/1998 | Fiore, Jr. et al. | |
| 5,918,409 A | 7/1999 | Camwath | |
| 5,953,853 A | 9/1999 | Kim | |
| 6,202,340 B1 | 3/2001 | Nieves | |
| 6,735,899 B1 | 5/2004 | Anderson et al. | |
| 7,219,466 B2 | 5/2007 | Rich et al. | |
| 7,690,147 B2 | 4/2010 | Wetzel et al. | |
| 8,302,345 B2 | 11/2012 | Nelson et al. | |
| 9,374,993 B2 | 6/2016 | Smith | |
| 9,743,657 B2 | 8/2017 | Rich et al. | |
| 11,219,204 B2 | 1/2022 | Kletzli et al. | |
| 2002/0167409 A1 | 11/2002 | Cristofori et al. | |
| 2004/0111953 A1* | 6/2004 | Anderson ............. | A01M 23/04 43/112 |
| 2005/0097808 A1 | 5/2005 | Vorhies et al. | |
| 2007/0068971 A1 | 10/2007 | Garcia | |
| 2009/0013587 A1* | 1/2009 | Wetzel .................. | A01M 23/38 43/98 |
| 2009/0172995 A1 | 7/2009 | Wetzel et al. | |
| 2010/0146839 A1 | 6/2010 | Cruz et al. | |
| 2010/0283610 A1 | 11/2010 | Wetzel et al. | |
| 2011/0239526 A1* | 10/2011 | Nelson ................ | A01M 31/002 43/58 |
| 2012/0124887 A1* | 5/2012 | Rich .................... | A01M 31/002 43/73 |
| 2014/0053788 A1* | 2/2014 | Riddell ................ | A01M 29/26 119/712 |
| 2014/0300477 A1 | 10/2014 | Rich et al. | |
| 2015/0320029 A1 | 11/2015 | Noe et al. | |
| 2018/0096581 A1 | 4/2018 | Daly, Jr. | |

FOREIGN PATENT DOCUMENTS

| | | | |
|---|---|---|---|
| JP | 4735594 | B2 | 7/2011 |
| JP | 4739039 | B2 | 8/2011 |
| JP | 5429760 | A | 2/2014 |
| JP | 1524663 | | 6/2015 |
| WO | 03084320 | A1 | 10/2003 |
| WO | 2007068971 | A1 | 6/2007 |
| WO | 2010030346 | A1 | 3/2010 |
| WO | 2019079053 | A1 | 4/2019 |

OTHER PUBLICATIONS

Indian Search Report, Application No. 202017035865, Dated: Mar. 17, 2022, 7 pages.
Eurepean Search Report, Application No. 20775441.7-1004, Dated: Mar. 24, 2022, 3 pages.
Chinese First Office Action dated Aug. 22, 2022 (with English translation thereof), corres. to Application No. 201980022813.1, 21 pages.
Extended European Search Report, Application No. 19750259.4-1004, Dated: Jul. 23, 2021, 8 pages.
PCT Search Report, Application No. PCT/US2019/022523, Dated: Jul. 25, 2019, 3 pages.
PCT Search Report, Application No. PCT/US2019/022523, Dated: Apr. 24, 2020, 23 pages.
PCT Search Report, Application No. PCT/US2020/046279 Dated: Mar. 9, 2021, 17 pages.
Examination Search Report issued by the Canadian Patent Office, Application No. 3,147,305, dated Dec. 7, 2023, 5 pages.
Preliminary Office Action issued by the Brazilian Patent Office, Application No. BR112020016423-2, dated Nov. 28, 2023, 4 pages.
Australian Examination Report, Application No. 2019218992, Dated: Apr. 29, 2022, 6 pages.
Japanese Office Action and English Translation, Application No. 2020-564826, Dated: May 17, 2022, 7 pages.
Search and Examination Report dated Sep. 20, 2023, corresponding to Application No. GB2202135.6, 5 pages.
Brazilian Office Action dated Nov. 6, 2024, corresponding to Application No. BR112020016423-2, 6 pages.

* cited by examiner

ELECTRONIC RODENT TRAP WITH REMOTE MONITORING CAPABILITY

CROSS-REFERENCE TO RELATED APPLICATIONS

This application is a continuation of U.S. patent application Ser. No. 15/894,669, filed Feb. 12, 2018.

FIELD OF THE INVENTION

The present invention is related to the field of pest control and, more particularly, to an electronic rodent trap that demonstrates improved rodent interaction and dispatch and that has remote monitoring capability with improved reporting accuracy.

BACKGROUND

Electronic rodent traps have been available for many years. These traps typically have a single entrance door and are equipped with two or three killing plates which serve to both detect the rodent and deliver a high voltage pulse train to dispatch the rodent. Electronic rodent traps having two or three killing plates include those described in U.S. Pat. No. 6,735,899 ("the '899 patent") and U.S. Pat. No. 7,219,466 ("the '466 patent"), which are owned by the assignee of the instant application. The complete disclosures of the '899 patent and the '466 patent are hereby expressly incorporated by reference herein as if fully set forth in their entirety.

One problem with many rodent traps is that rodents have a documented behavior of being cautious around, or completely avoiding, single entrance traps and bait boxes. Because of this behavior, having only a single entrance to a rodent trap can lead to lower interactions or complete trap avoidance.

Another problem with existing electronic rodent traps is that the plates are oriented in series so that, in a three killing plate configuration, the rodent first encounters plate one, then plate two and then plate three. Plates one and two are not energized by the high voltage circuit until the rodent contacts plate three. As a result, the trap may not be triggered if the rodent does not fully enter the trap. Alternatively, the trap may be triggered by a rodent that is not properly oriented within the trap, increasing the likelihood that the rodent will spring back when the high voltage is initiated and escape electrocution.

Yet another problem with currently deployed electronic rodent traps having remote monitoring capability is the propensity for false triggering of the trap due to environmental conditions, such as water, or trap interaction with a non-target species, such as upon insects entering the trap. When notifications of such false triggers are sent by the remotely reporting traps, time is wasted checking traps that have not, in fact, been triggered by a rodent. A remote wireless notification electronic rodent trapping system and method is disclosed in U.S. Pat. No. 9,743,657 ("the '657 patent") which is also owned by the assignee of the present invention. The complete disclosure of the '657 patent is hereby expressly incorporated by reference herein as if fully set forth in its entirety.

Accordingly, a need exists for an electronic rodent trap that is more likely to be entered by a rodent and that, upon such entry, is more likely to effectively dispatch the rodent through better plate arrangement and related trap structural design features. A need also exists for an electronic rodent trap with remote monitoring capability that is both more robust in operation and less susceptible to false triggers so as to reduce the number of incorrect notifications sent to the user as a result of environmental conditions and/or non-rodent interactions with the trap.

SUMMARY

In view of the foregoing, the present invention is directed to an electronic rodent trap and, preferably, to an electronic rodent trap having remote reporting capability. The trap includes a high voltage killing circuit having at least two lower plates adjacent the floor of the trap and a third or upper plate positioned above the floor of the trap, preferably adjacent the ceiling. The two lower plates, which extend longitudinally, are oriented in parallel with one another and are separated by a central channel so as to extend like train tracks. The upper plate is the triggering plate so that, as a rodent first enters the trap and comes into contact with the two parallel lower plates, the trap does not activate. However, once the rodent has entered the trap sufficiently to touch the upper plate, such as with its nose, the two lower plates upon which the rodent is standing are energized along with the upper plate to deliver a high voltage pulse train to dispatch the rodent.

Each of the lower plates is preferably substantially L-shaped in cross-section, having a first planar member generally parallel with the floor and a second planar member generally perpendicular to the first planar member so as to project upwardly away from the floor. Preferably, the first and second planar members are unitary with one another, being formed by a single piece of electrically conductive material bent at about a 90.degree. angle. The second planar members, also referred to as the upwardly bent inner edges of the lower plates, extend generally parallel with one another and with the central channel.

According to one embodiment, the lower plates are raised so as to be spaced above the floor while the bottom of the central channel corresponds with the floor of the trap. The upper plate is preferably positioned on a center baffle that projects downwardly toward the floor to create a height-constricting barrier substantially transverse to the longitudinal length of the trap.

The trap preferably has at least two entrance openings on opposing ends of the trap that are aligned with one another to create a tunnel which allows a rodent to see longitudinally through the trap from one entrance to the other. The upper plate is arranged approximately midway along the longitudinal length of the trap tunnel so as to be equally accessible from either entrance while the parallel plates extend approximately the entire length of the trap.

The trap preferably also includes a depending entry baffle at each end of the trap adjacent and inside the respective entrance opening. The entry baffles force the rodent to be in contact with the upwardly bent inner edges of the lower plates upon entering the trap and, by contacting the rodent in the mid-back when the trap is triggered, reduce the ability of the rodent to jump back and/or off the lower plates during the shock cycle.

According to a preferred embodiment, the trap has remote monitoring and reporting capability. The elevated position of the lower plates above the floor of the trap enables the trap to operate effectively in a "hose down" or outdoor environment with limited susceptibility to false triggers due to water or moisture condensation. In addition, the requirement that the pest contact both the lower plates and the upper plate to activate the trap renders the trap virtually impervious to unwanted triggering by insects entering the trap. As a result, false triggers and the associated generation of incorrect notifications sent to a remote monitoring station are reduced.

The trap according to the present invention further includes an improved baiting method. The bait cup is positioned above the center baffle which is vented with at least one and preferably several holes, slots or other apertures that allow the flow of air to spread the scent of the bait throughout the trap. This vented baffle acts as a shield, preventing the rodent from stealing the bait, while yet allowing the smell of the bait to effectively draw the rodent to the upper trigger plate and properly position the rodent for trap activation and dispatch.

For enhanced durability and cost effective operation, particularly as implemented within a commercial pest control system and method, the electronic rodent trap according to the present invention can have a modular construction. According to a preferred embodiment, the modular construction includes an outer housing with a base configured to receive a removable electronics module and a removable tunnel assembly, or tunnel module, as inner trap components. The base is covered by a lid, which may be hinged to the base, and further includes access openings that align with entrance openings in the removable tunnel assembly. The outer housing protects the inner trap components, making the trap more resistant to possibly damaging conditions in the environment or associated with handling of the trap, while the modular design allows these inner components or modules to be removed and replaced separately by opening the lid of the outer housing.

In the modular configuration, the electronics module includes a waterproof, or water resistant, electronics module housing that contains a power source (battery) and the high voltage circuitry used to activate the killing plates which are positioned in the killing chamber of the tunnel assembly. An outer wall of the electronics module housing and an outer wall of the tunnel module are each provided with mating electrical contacts that interact to connect the power source and the high voltage circuitry in the electronics module with the killing plates in the tunnel module when the trap is fully assembled.

The tunnel assembly includes a tunnel base having a floor and two side walls extending between opposed entrance openings, and a removable cover panel that together with the tunnel base define the killing chamber. The lower plates are positioned adjacent the floor of the tunnel base, and are preferably on elevated tracks above the floor, as has already been described. The entry baffles and the center baffle with the third plate project from the inner or lower side of the cover panel to extend downwardly into the killing chamber when the panel is secured to the tunnel base. The outer or upper side of the cover panel includes an opening into the center baffle for receiving the bait cup.

As assembled, the electronics module and the tunnel module are fitted adjacent one another and enclosed within the outer housing with the electrical contacts on the outer wall of the tunnel base coupling the killing plates in the tunnel module to the contacts on the electronics module housing. When the lid of the outer housing is closed, rodents may enter the killing chamber through the aligned outer housing access openings and tunnel module entrance openings while the electronics module housing keeps the high voltage circuit components safely isolated from rodent contact.

Accordingly, it is an object of the present invention to provide an electronic rodent trap having a high voltage killing circuit that includes a plurality of killing plates including at least two lower plates arranged in substantially parallel spaced relationship with one another and extending longitudinally through the trap, like train tracks generally perpendicular to the entrance opening or openings, and a third trigger plate in an elevated position spaced above the lower plates so that, as the rodent enters, the rodent contacts a first lower plate on the left side of the trap with its left feet and a second lower plate on the right side of the trap with its right feet while the trap remains inactive and then, upon the rodent contacting the third trigger plate while standing on the lower plates, the third plate triggers activation of the killing circuit.

Another object of the present invention is to provide an electronic rodent trap in accordance with the preceding object in which the lower plates are generally L-shaped in cross-section, having a first planar member generally parallel with the floor and a second planar member generally perpendicular to the first planar member, preferably formed by bending the plate about 90.degree., so that the second planar member projects as an upwardly bent inner edge, the bent shape of the lower plates increasing a rodent's contact with the lower plates, particularly when the trap is triggered.

Yet another object of the present invention is to provide an electronic rodent trap in accordance with the preceding objects in which the trap includes at least two entrances that are preferably on opposing ends of the trap and aligned with one another to create a tunnel which allows a rodent to see longitudinally through the trap from one entrance to the other to increase interaction with, and ingress into, the trap.

A further object of the present invention is to provide an electronic rodent trap in accordance with the preceding objects in which the upper plate is positioned adjacent the ceiling of the trap and the lower plates are raised above the floor of the trap to enable the trap to operate effectively in a "hose down" or outdoor environment with limited susceptibility to false triggers due to water or moisture contacting the lower plates, thereby avoiding the generation of incorrect notifications sent to a remote monitoring station.

Yet a further object of the present invention is to provide an electronic rodent trap in accordance with the preceding objects in which false triggers in response to insect entry, and the associated generation of incorrect notifications sent to a remote monitoring station caused by insects, are also reduced due to the requirement that both the upper and lower plates be contacted before the trap will activate.

A still further object of the present invention is to provide an electronic rodent trap in accordance with the preceding objects in which the trap includes an entry baffle positioned adjacent and inwardly of each trap entrance, the entry baffles forcing the rodent into contact with the lower plates, especially the upwardly bent inner edges of the lower plates and, being positioned to contact the rodent in the mid-back when the rodent triggers the trap, serving to hold the rodent in place and prevent it from jumping backward during the shock cycle.

Another object of the present invention is to provide an electronic rodent trap in accordance with the preceding objects in which the trap is tunnel shaped with an entrance at each end, and the upper plate is positioned on a center baffle that extends downwardly toward the floor to create a height-restricted barrier substantially transverse to, and approximately midway along, the longitudinal length of the trap.

Yet another object of the present invention is to provide an electronic rodent trap in accordance with the preceding objects in which a bait cup is positioned above the center baffle, the center baffle protecting the bait from being stolen by the rodent but being vented to allow the scent of the bait to spread throughout the trap and draw the rodent toward the middle of the trap.

It is another object of the present invention to provide an electronic rodent trap, with or without remote reporting and/or monitoring capability, that includes the combination of a pair of oppositely charged killing plates arranged substantially parallel with one another near the trap floor, the pair of plates extending at least partly along the longitudinal length of the trap, generally perpendicular to the trap entrance opening, and being spaced from one another by a longitudinally extending gap or channel, and a trigger or sensing element, preferably a third charged plate, in an elevated position above the floor of the trap, rodent contact with the trigger or sensing element triggering the high voltage circuit and activating the plates to dispatch the rodent.

Another object of the present invention is to provide an electronic rodent trap in accordance with the preceding object in which the trap has a tunnel shape with two opposing entrances in alignment with one another to allow the rodent to see through the trap from one end to the other.

Yet another object of the present invention is to provide an electronic rodent trap in accordance with either or both of the preceding two objects in which the lower plates are supported on raised tracks that space the lower plates above the floor, the bottom of the gap or channel that separates the lower plates corresponding with the floor of the trap.

Still another object of the present invention is to provide an electronic rodent trap in accordance with any or all of the preceding three objects in which the lower plates are bent at about 90.degree. with a planar portion lying flat on the raised tracks and an upwardly directed bent inner edge portion, the bent shape of the lower plates increasing contact between the plates and the rodent.

A further object of the present invention is to provide an electronic rodent trap in accordance with any or all of the preceding four objects in which each entrance has an associated entry baffle, the entry baffles forcing the rodent into contact with the lower plates, especially the upwardly bent inner edge portions thereof, and being positioned to contact the rodent in the mid-back when the rodent triggers the trap.

A still further object of the present invention is to provide an electronic rodent trap in accordance with any or all of the preceding five objects in which the upper plate is part of a center baffle that extends downwardly from the trap ceiling, the trap including a bait cup positioned behind the center baffle, the center baffle protecting the bait from being stolen by the rodent but being vented to allow the scent of the bait to spread throughout the trap and draw the rodent toward the middle of the trap and contact with the upper plate.

Yet a further object of the present invention is to provide an electronic rodent trap including a trap body having a longitudinal length greater than a width thereof and extending from the trap entrance to an opposite end, a high voltage killing circuit operative within the trap body, the killing circuit including a pair of oppositely charged killing plates in substantially parallel relationship with one another, each plate extending longitudinally within the trap body adjacent a respective one of the side walls, the pair of killing plates being spaced from one another by a longitudinally extending gap between the plates, and a third plate positioned above the pair of plates and spaced inwardly from the entrance door so that a rodent must enter the trap before it can reach the third plate, contact by the rodent with the third plate triggering the high voltage killing circuit to activate all three plates and dispatch the rodent.

A still further object of the present invention is to provide an electronic rodent trap including a trap body having at least one trap entrance and a floor extending longitudinally from the trap entrance to define a killing chamber, a high voltage killing circuit operative within the trap body that includes a pair of oppositely charged killing plates extending in substantial parallel relationship with one another along the longitudinally extending floor, the pair of killing plates being spaced from one another by a longitudinally extending gap between the plates, and a trigger sensor to sense the presence of a rodent positioned across the killing plates and to trigger the high voltage killing circuit to activate the pair of killing plates and dispatch the rodent.

It is another object of the present invention to provide an electronic rodent trap with remote reporting capability in accordance with any or all of the preceding objects that can be modular in design, including an outer housing configured to receive removable inner trap components including an electronics module and a tunnel assembly, or tunnel module, the outer housing protecting the inner trap components while allowing such inner components or modules to be replaced separately.

Yet another object of the present invention is to provide a modular electronic rodent trap in accordance with the preceding objects in which the electronics module includes a waterproof electronics housing that contains the power source (battery) and high voltage circuitry used to power the plurality of killing plates positioned in the killing chamber of the tunnel assembly, an outer wall of the electronics module housing and an outer wall of the tunnel module being provided with mating electrical contacts that interact to connect the power source and the high voltage circuitry in the electronics module with the killing plates in the tunnel module when the trap is fully assembled.

Still another object of the present invention is to provide a modular electronic rodent trap in accordance with the preceding objects in which the removable tunnel module includes a tunnel base having a floor and two side walls extending between two opposed entrance openings, and a removable cover panel that covers the tunnel base to define a killing chamber, the pair of lower plates being positioned adjacent the floor of the tunnel base, and the entry baffles and the center baffle with the third plate thereon projecting from the inner or lower side of the cover panel to extend downwardly into the killing chamber when the panel is secured to the tunnel base, the outer or upper side of the cover panel including an opening into the center baffle for receiving the bait cup.

It is another object of the present invention to provide a modular electronic rodent trap having an outer housing with a base configured to receive a removable electronics module and a removable killing chamber module, the killing chamber module containing a plurality of killing plates and having at least one entrance opening, the outer housing base having an access opening in alignment with the killing chamber module entrance opening when the trap is assembled, the electronics module including a waterproof or water resistant electronics housing that contains a power source and the high voltage circuitry used to energize the plurality of killing plates positioned in the killing chamber module, an outer wall of the electronics module housing and an outer wall of the killing chamber module being provided with mating electrical contacts that interact to connect the high voltage circuitry in the electronics module with the killing plates in the killing chamber module when the modules are mounted adjacent one another within the outer housing, the outer housing having a lid that fits over the base so that access into the killing chamber may be gained only through the entrance opening as aligned with the housing access opening.

Still another object of the present invention to provide a modular electronic rodent trap in accordance with the preceding object in which the plurality of killing plates includes at least two oppositely charged lower plates positioned adjacent a floor of the killing chamber module, the killing chamber module also including a triggering element in an elevated position spaced above the floor, activation of the high voltage circuitry being triggered when the rodent contacts the triggering element, such as with its nose, while standing on the lower plates.

Yet another object of the present invention is to provide a modular electronic rodent trap in accordance with the preceding two objects in which the two lower plates are oriented substantially in parallel with one another, having at least portions thereof that extend longitudinally like train tracks oriented perpendicular to the entrance opening so that the rodent contacts one plate with its left feet and the other substantially parallel plate with its right feet, the longitudinally extending portions of the lower plates being separated from one another by a longitudinally extending channel.

Still another object of the present invention is to provide a modular electronic rodent trap in accordance with the preceding three objects in which the triggering element is a third charged plate that projects downwardly into the killing chamber while remaining spaced above the lower plates.

Yet another object of the present invention is to provide a modular electronic rodent trap in accordance with the preceding four objects in which the killing chamber module has two entrances on opposing ends of the trap that are aligned with one another to create a tunnel which allows the rodent to see longitudinally through the trap from one entrance to the other, the outer housing base having corresponding access openings on opposing sides thereof, the third charged plate being associated with a center baffle positioned approximately midway along the longitudinal length of the tunnel trap.

A further object of the present invention is to provide a modular electronic rodent trap having an outer housing, a removable tunnel module configured to be received within the outer housing and defining a killing chamber extending from an entrance opening at one end of the chamber, the killing chamber having at least two killing plates and a triggering element positioned therein, and a removable electronics module configured to be received within the outer housing and containing high voltage circuitry operative to power the killing plates, the tunnel module and the electronics module each having opposed side walls with electric contacts which mate with each other when the modules are positioned within the outer housing so that the high voltage circuitry activates the killing plates when a rodent inside the killing chamber contacts the killing plates and the triggering element at the same time.

A still further object of the present invention is to provide a modular electronic rodent trap in accordance with any of the preceding objects that has an electronics module with a microprocessor coupled to both a mouse circuit and a rat circuit, the outer housing having a lid equipped with a safety switch to prevent activation of the high voltage circuitry until the lid is closed, the safety switch including first and second closure engagements each having a respective input to the microprocessor, activation of the first closure engagement instructing the microprocessor to activate the rat circuit, activation of the second closure engagement instructing the microprocessor to activate the mouse circuit, whereby the same electronics module can be used to operate both mouse trap and rat trap versions of the electronic rodent trap through inputs from the safety switch.

Yet a further object of the present invention is to provide a modular electronic rodent trap with remote notification capability in accordance with the preceding objects that is robust in a warehouse or other pseudo-outdoor environment where water exposure is possible, the trap providing improved functionality in both rodent dispatch and accurate kill notifications, and the modular design making the trap more durable and cost effective in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The invention will now be described by way of example with reference to the accompanying Figures, of which.

DETAILED DESCRIPTION OF THE EMBODIMENTS

Figure 1:
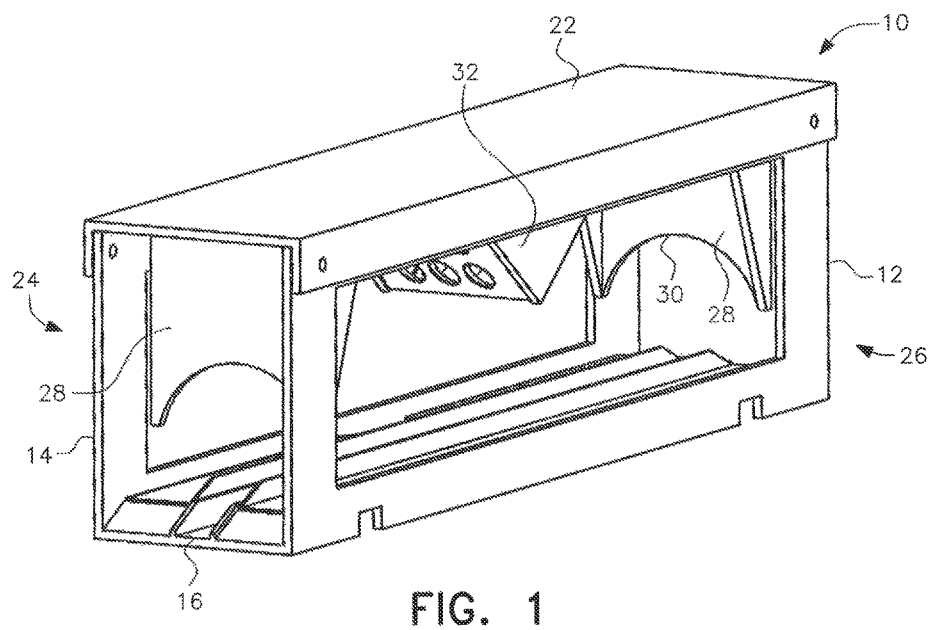
FIG. 1 is a perspective view of an electronic rodent trap in accordance with a first embodiment of the present invention, shown with part of one side removed to expose the trap interior.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Further, the electronic rodent trap according to the present invention may be configured as a mouse trap or as a rat trap with appropriate adjustments in sizing, dimensions, power output and the like as would be understood by persons of skill in the art as being required for the differences in rodent size and hardiness. Therefore, in the absence of a specific description pertaining to only one version or configuration of the trap, the following description is intended to cover both mouse trap and rat trap versions of each of the embodiments described herein.

As shown in FIG. 1, the present invention is directed to an electronic rodent trap generally designated by reference numeral 10. The trap 10 includes two side walls 12, 14, a floor 16, and a ceiling 18 (see FIG. 2) that define a trap body generally designated by reference numeral 20. In FIG. 1, part of side wall 12 is cut away to show the interior of the trap. In use, the ceiling of the trap body is preferably covered by a removable lid 22, such as when the trap is configured with a modular structure having an outer housing as will be described later herein in connection with FIGS. 9-23.

In the embodiment shown in FIGS. 1-8, the trap body extends longitudinally with a first entrance generally designated by reference numeral 24 and a second entrance generally designated by reference numeral 26 on opposing ends thereof. The entrances 24, 26 are preferably aligned with one another to create a tunnel which allows a rodent to see longitudinally through the trap from one entrance to the other. This visibility encourages rodent interaction with, and ingress into, the trap. However, the trap according to the instant invention is not intended to be limited to a tunnel-shaped trap or even to traps having more than one entrance as the killing plate configuration and other features to be described herein may also be used in traps having only a single entrance. So, more generally, the present invention includes an electronic rodent trap including a trap body or housing having two side walls, a lid or ceiling, and a floor with at least one trap entrance, a longitudinal length of the trap body being greater than a width thereof and extending from the trap entrance to an opposite end, with the opposite end preferably having a second entrance.

A generally vertical entry baffle 28 is positioned adjacent and inwardly of each trap entrance. Each entry baffle 28 extends downwardly from the ceiling 18 toward the floor 16 and preferably has a generally semi-circular cutout that forms an arch-shaped lower edge 30. This particular shape is not necessary, however. The entry baffles 28 serve to assist in positioning the rodent properly to make the trap most effective and also limit the rodent's range of movement once the trap is triggered as will be discussed further hereinafter.

Figure 2:
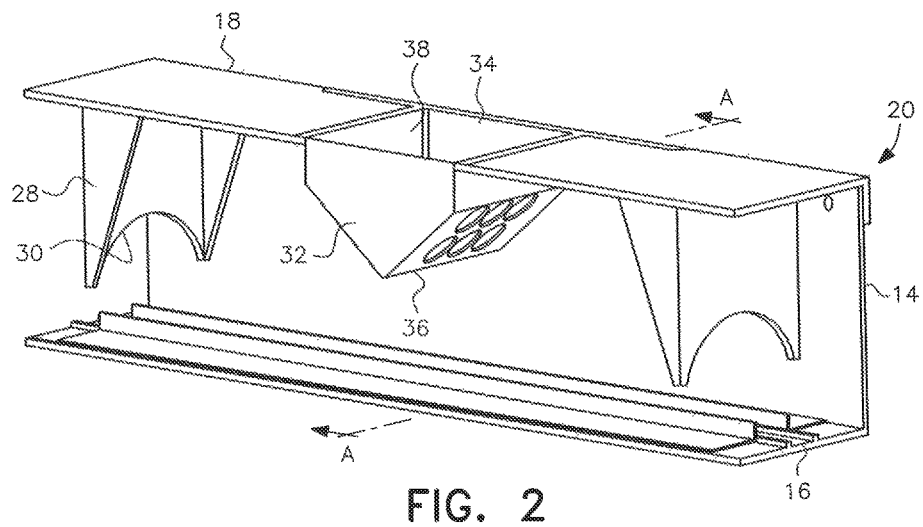
FIG. 2 is another perspective view of the trap shown in FIG. 1 in which the entire one side and lid have been removed.

Also extending downwardly from the ceiling 18 is a center baffle 32, better seen in FIG. 2 where a partial view of the trap body 20 is provided with the lid 22 and side wall 12 removed. The center baffle 32 extends downwardly toward the floor to create a height-restricted barrier substantially transverse to, and approximately midway along, the longitudinal length of the trap. The center baffle 32 in the embodiment shown tapers from a generally rectangular upper opening 34 into a V-shaped body 35 having an angled or pointed lower edge 36. This shape may be varied without departing from the intended scope of the invention. However, the upper opening 34 provides access to a hollow interior generally designated by reference numeral 38 within the baffle 32 that holds a bait cup 40 (see FIGS. 6 and 8). By removing the lid 22, the user can place bait in the bait cup 40 through the upper opening 34. Once in the cup and with the lid replaced, the bait cannot be stolen by the rodent while the smell of the bait is nonetheless able to spread throughout the trap through the vent openings 42 in the center baffle 32 (see FIG. 7). The location of the bait in the center of the trap also assists in proper placement of the rodent prior to trap activation and, by providing access to the bait cup through the top of the trap, makes it easy for the user to introduce a variety of different kinds of bait and/or to remove the bait cup for cleaning.

Figure 3:
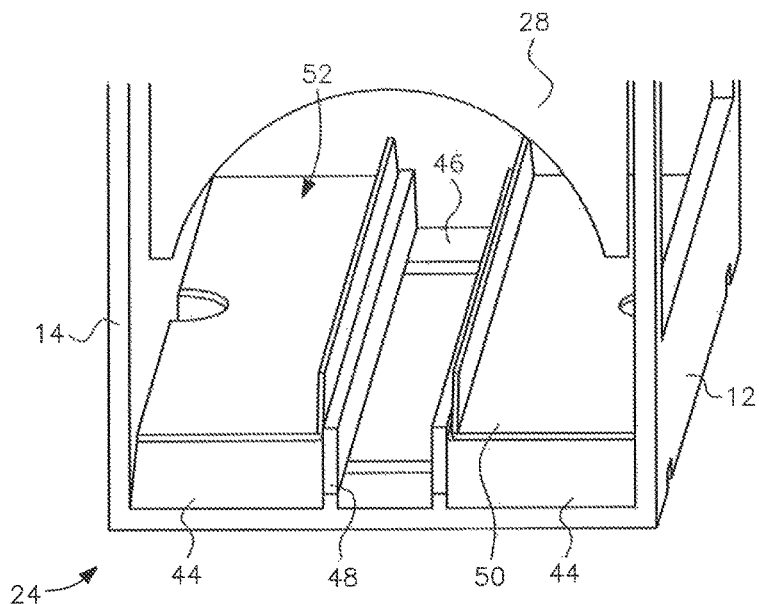
FIG. 3 is a partial end perspective view of the trap shown in FIG. 1, showing the lower plates with the upwardly bent inner edges and entry baffle.
Figure 4:
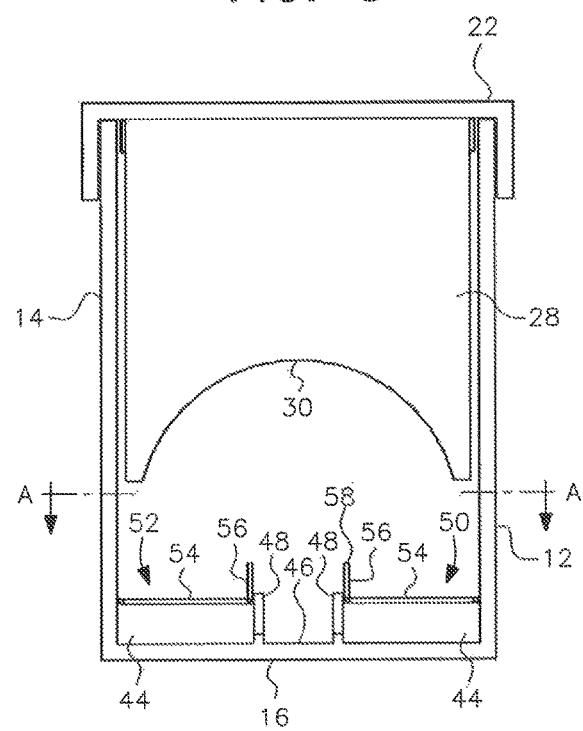
FIG. 4 is an end view of the trap shown in FIG. 1, also showing the lower plates with the upwardly bent inner edges and entry baffle.
Figure 5:
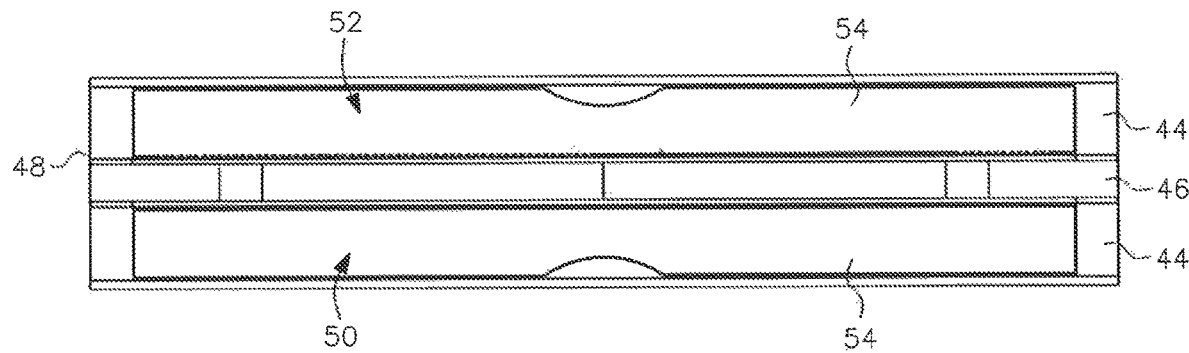
FIG. 5 is a top view taken along line A-A of FIG. 4, showing the lower killing plates and central channel.
Figure 6:
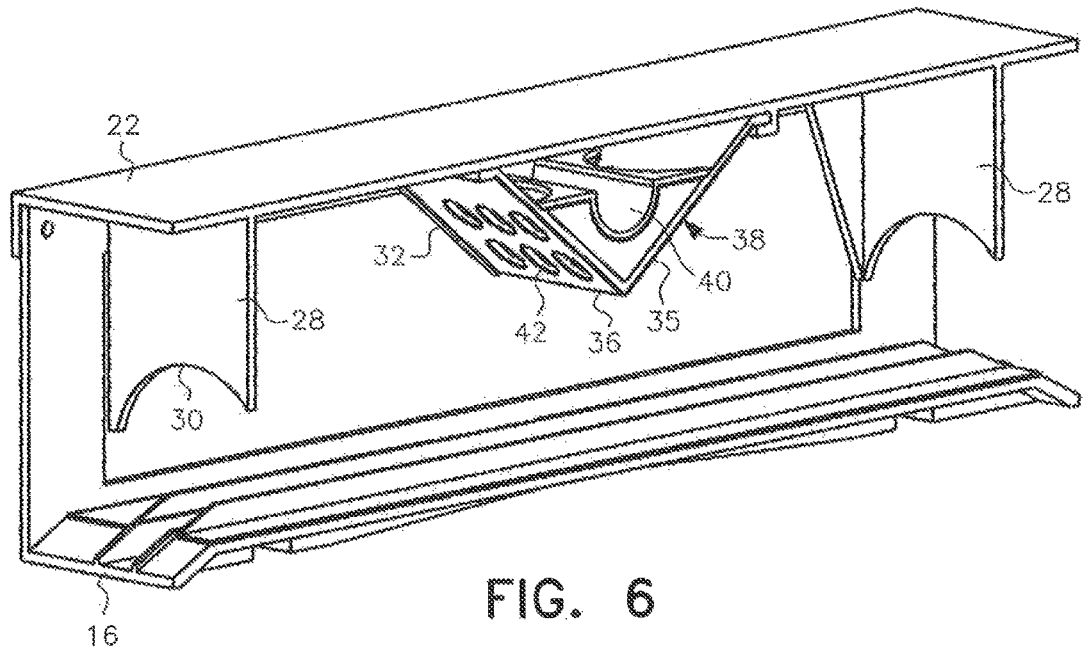
FIG. 6 is a side cut-away perspective view of the trap shown in FIG. 1, showing the bait cup positioned in the hollow interior of a V-shaped center baffle.

As best seen in FIGS. 3-5, the floor has two elevated tracks 44 that extend longitudinally along each side wall 12, 14. The width of each of the tracks is between about 0.1 inches and about 3.0 inches, and preferably about 0.75 inches for mice and about 0.875 inches for rats. The tracks 44 are separated by a channel 46 that runs at least part of the length of the trap body between the two entrances. The width of the channel 46 may be up to about 1.5 inches, and is preferably between about 0.1 inches and about 1.5 inches for rats and up to about 0.75 inches for mice and, more preferably, is about 0.5 inches for rats and about 0.375 inches for mice to provide a comfortable spacing for the average size of the rodent (rat or mouse) for which the trap is intended. The height of the elevated tracks 44 above the floor may be up to about 1.5 inches and is preferably about 0.5 inches. The tracks preferably include a further raised inner edge 48 that runs along and defines the sides of the central channel 46. The edge 48 may be integral with the tracks 44 or may be formed by a separate wall element.

The trap includes at least three killing plates including at least two oppositely charged lower plates generally designated by reference numerals 50, 52 arranged substantially parallel with one another and extending longitudinally through the trap on top of the elevated tracks 44. As shown, the parallel plates 50, 52 are generally perpendicular to the entrance openings 24, 26. The tracks and the plates thereon extend longitudinally within the trap body and adjacent a respective one of the side walls, with the width of the two lower plates being approximately the same as the width of the tracks upon which they are mounted.

The parallel arrangement of the two oppositely charged plates 50, 52 ensures that the rodent contacts both plates immediately upon entering the trap. With reference to the entrance 24 shown in FIG. 3, upon entry to the trap the rodent contacts the right lower plate 50 with right front foot and the left lower plate 52 with left front foot, and the rodent stays in contact with both plates, including subsequent contact with the back feet, as it moves through the trap. The trap is not triggered, however, until contact is made with an elevated third plate which energizes all of the plates as will be described hereinafter.

Figure 7:
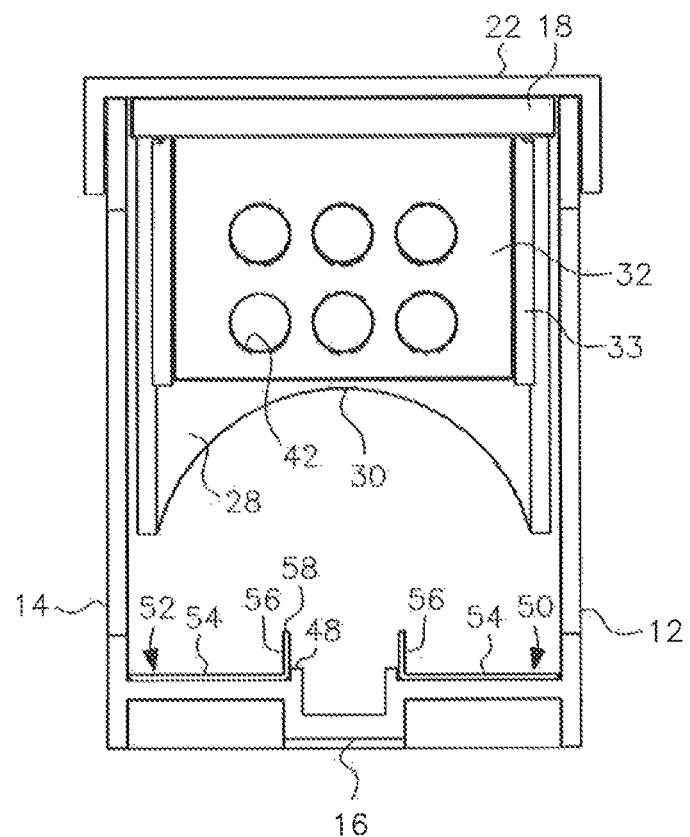
FIG. 7 is a cross-sectional view taken along line A-A of FIG. 2, showing the vented center baffle and upwardly bent lower plates.
Figure 8:
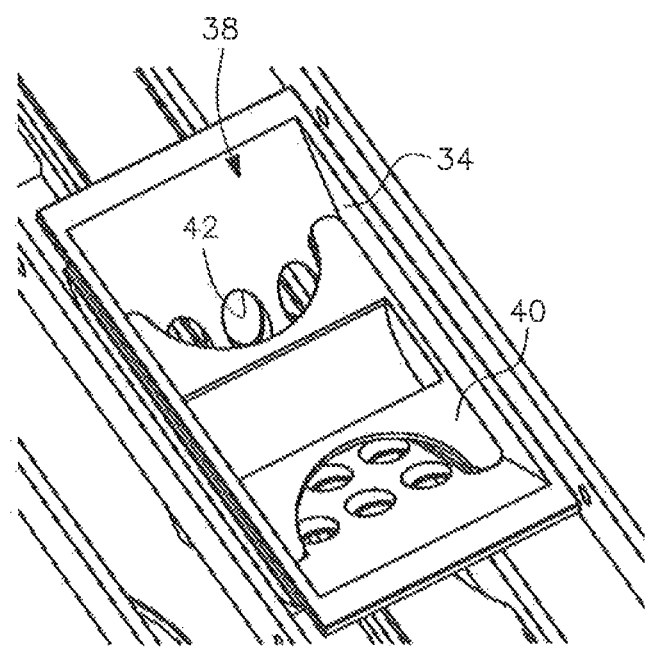
FIG. 8 is a partial upper perspective view of the center of the trap with the lid removed to show the bait cup inside the center baffle in accordance with the trap embodiment shown in FIG. 6.

The lower plates 50, 52 are generally L-shaped in cross-section, each having a first planar member 54 generally parallel with the floor central channel 46 and a second planar member 56 generally perpendicular to the first planar member 54 (see FIGS. 4 and 7). The two planar members 54, 56 are preferably formed by bending each plate 50, 52 about 90.degree., so that the second planar member 56 projects upwardly as a bent inner edge positioned adjacent, and generally parallel with, the respective raised inner edge 48 of the elevated track upon which the plate is supported. As shown, the upper edge 58 of the second planar member 56 extends upwardly beyond the upper edge of the raised inner edge 48, having a height of up to about 0.75 inches and preferably about 0.25 inches. The bent shape of the lower plates 50, 52 increases a rodent's contact with the lower plates as the rodent's feet are on the first planar member 54 while the second planar member 56 provides additional contact with the rodent near its chest and/or belly through its fur, particularly as the rodent squeezes under the entry baffle. This is advantageous both during trap activation, as the bent shape provides better contact with the rodent and also brings the shock closer to being across the rodent's chest/body for a quicker dispatch, and also for kill verification after trap activation.

With respect to the latter, the trap of the present invention, according to a preferred configuration, has remote monitoring capability and is configured to verify the continued presence of the rodent after a killing cycle before sending a kill notification to the user. This process is the same as that described in the '466 patent, previously incorporated by reference herein. However, unlike the flat plates in the '466 patent which may be degraded in resistance sensing capability due to dirt and debris on the plates creating poor contact, the upwardly directed second members 56 of the bent lower plates 50, 52 enable the trap to detect a resistance passed through the rodent's fur to their skin. This improves kill verification and the accuracy of remote monitoring.

The trap further includes a third or upper plate 33 which may be separate or built into the center baffle 32. The upper plate 33 of baffle 32 is the trigger plate that activates the trap's high voltage circuit to dispatch a rodent that is standing on the lower plates. Therefore, when a rodent enters the trap and contacts both lower plates 50, 52 the trap remains inactive. However, when the rodent is drawn toward the bait and touches the upper plate 33 on the baffle 32, such as with its nose, the trap is triggered and activates the upper plate along with the two lower plates in like manner as described in the three-killing-plate configuration of the '466 patent. The rodent will likely lose contact with the third plate during the killing cycle but the baffle 32 aids in keeping the rodent in the trap for the full duration of such cycle.

Placement of the upper plate 33 in the center of the trap ensures that the rodent is far enough into the trap to have proper contact with the lower plates 50, 52 on the raised tracks 44 before the trap is triggered. Once triggered, the entry baffle 28 (whichever one is behind the rodent) further enhances the rodent's positioning and contact with the plates, hitting the rodent in the mid-back which both prevents the rodent from jumping backwards out of the trap and forces the rodent into contact with the bent members 56 of the lower plates through its fur as well as with the planar members 54 upon which it is standing. For rats, the distance between the lower edge 30 of the baffle and the plates 50, 52 is between about 0.75 inches and about 3.0 inches. Within this range, the distance from the lower edge 30 of the baffle to the first planar member 54 is preferably about 1.4 inches, and to the upper edge of the second planar member 56 is about 1.2 inches. For mice, the distance between the lower edge 30 of the baffle and the plates 50, 52 is between about 0.25 inches and about 1.5 inches. Within this range, the distance from the lower edge 30 of the baffle to the first planar member 54 is preferably about 0.7 inches, and to the upper edge of the second planar member 56 is about 0.6 inches.

In addition to making sure that the rodent is sufficiently within the trap before the trap is triggered, the use of an elevated third plate, such as plate 33 adjacent the ceiling of the trap, and the requirement that the upper plate be contacted along with the lower plates before the trap is triggered, provides two significant benefits to trap operation.

First, the separation between the upper plate and the lower plates virtually ensures that the trap will not be activated by insects. By reducing or eliminating such false triggers, the number of incorrect notifications sent to a remote monitoring station by the trap are also reduced, saving the time and effort that would otherwise be expended in checking empty traps.

Second, and in conjunction with placement of the lower plates on the raised tracks, the trap in accordance with the present invention is resistant to being triggered by water. As a result, the trap may be used effectively in a "hose down" or outdoor environment with limited susceptibility to false triggers due to water contacting the lower plates, thereby further avoiding the generation of incorrect notifications sent to a remote monitoring station. Placement of the bait within the center baffle and under the lid also protects the bait from water in the event the user were to hose down the area around the trap.

Should the trap be triggered in a hose-down situation, such as by water bouncing off the positive lower plate and hitting the upper plate, the trap could complete a killing cycle. However, the gap between the raised plates would prevent water from bridging across the lower plates such that the resistance required to confirm a kill would be absent.

As a result, false triggering of the trap is less likely to result in the sending of a confirmed kill notification.

Should a flooding situation occur such that the water level in the room rises to the point where the upper plate is contacted, all of the user's traps on the same level would be triggered at nearly the same time. Upon such an event, the pest controller can warn the user that another problem— beyond rodent control—has been experienced.

The raised parallel plates with upper trigger plate thus serve to make the trap less susceptible to false triggers and the sending of inaccurate kill notifications. By forcing the rodent to have at least one foot on both plates when the trap is triggered, and by delaying triggering until the rodent is sufficiently within the trap to contact the upper plate, the likelihood of a successful kill is enhanced.

According to a preferred embodiment of the present invention as shown in FIGS. 9-23, the electronic rodent trap is modular in design, providing enhanced durability and cost effective operation, particularly when implemented within a commercial pest control system and method.

Figure 9:
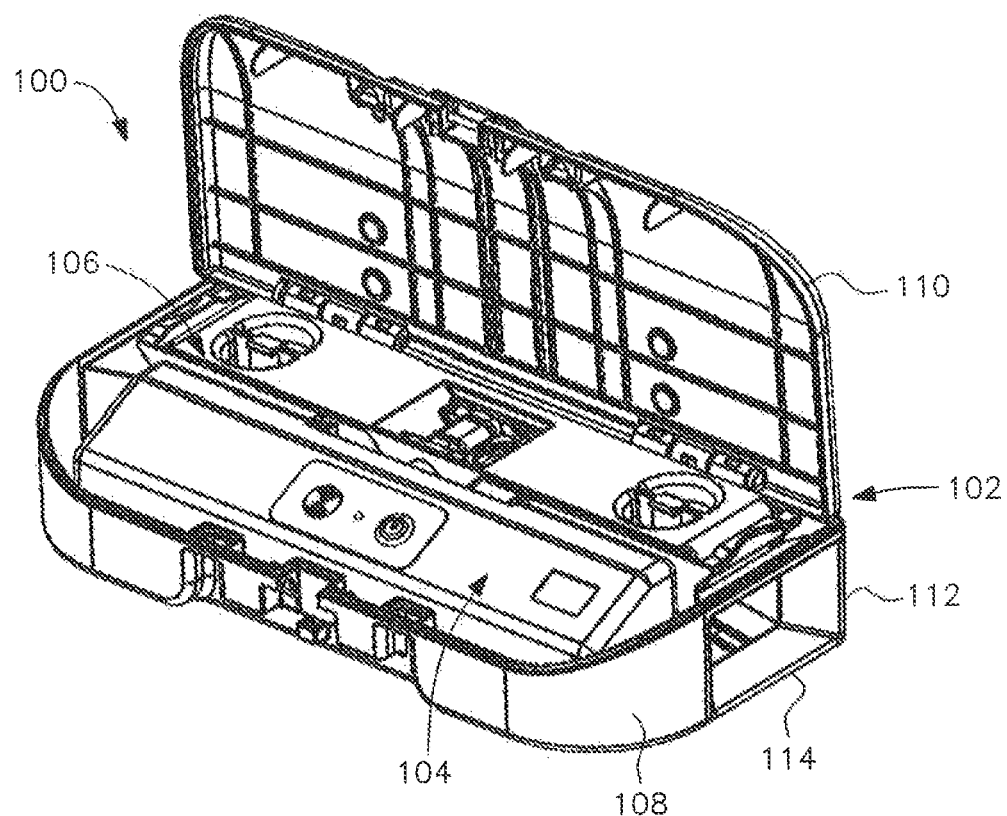
FIG. 9 is a perspective view of a modular electronic rodent trap having an outer housing, electronics module and tunnel module in accordance with a preferred embodiment of the present invention.
Figure 10:
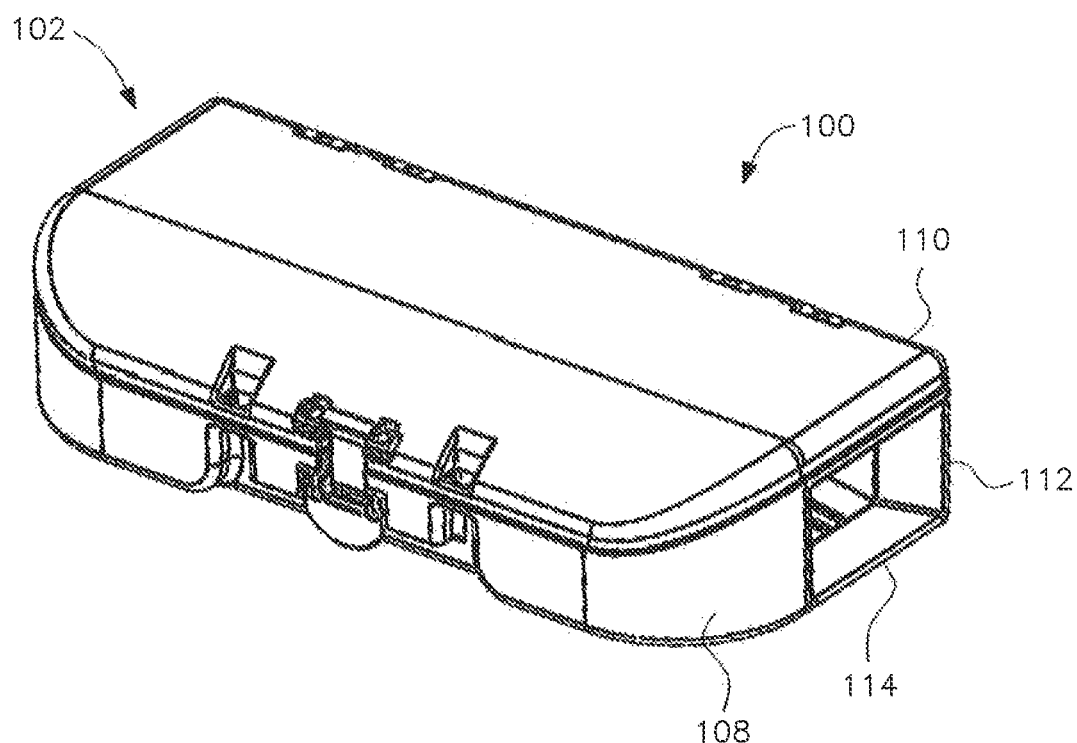
FIG. 10 is a perspective view of the modular trap shown in FIG. 9 with the lid of the outer housing closed.
Figure 11:
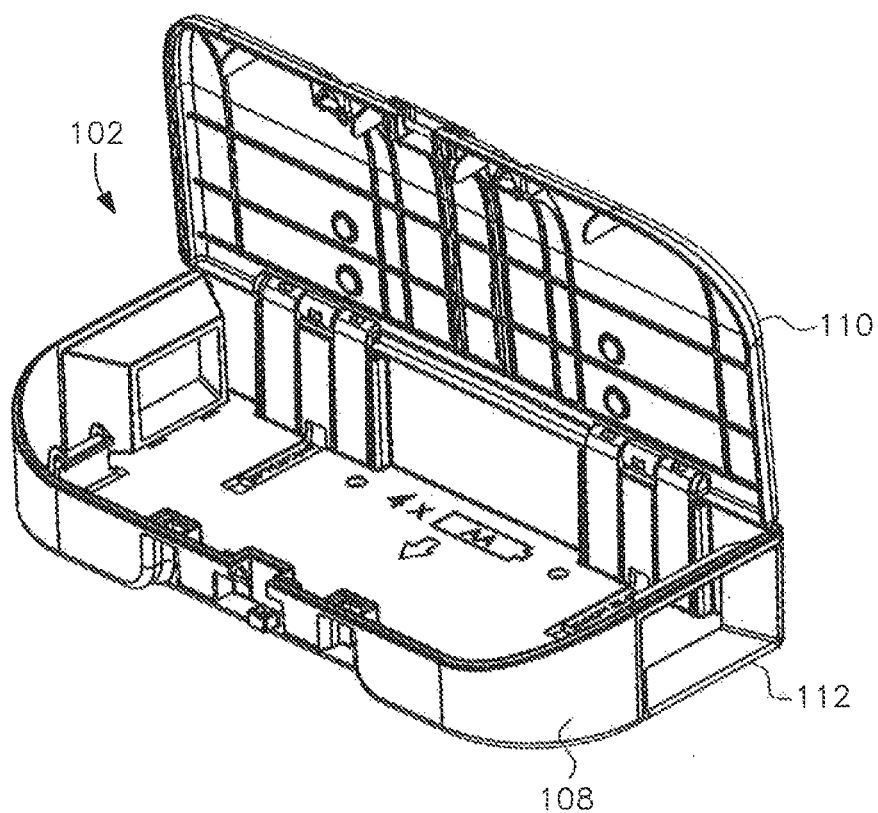
FIG. 11 is an isolated perspective view of the outer housing of the trap shown in FIG. 9, with lid open.

More particularly, FIG. 9 shows a modular electronic rodent trap generally designated by reference numeral 100 that includes an outer housing generally designated by reference numeral 102, with removable and replaceable inner components including an electronics module generally designated by reference numeral 104, and a tunnel assembly or tunnel module generally designated by reference numeral 106. The outer housing 102 includes a base 108, into which the electronics module 104 and tunnel module 106 are closely fitted adjacent one another, and a lid 110 that is closed and secured to the base when the trap is in use as shown in FIG. 10. The lid 110 may be hinged to the base or may be fully separable from the base 108. In the embodiment shown, the outer housing base 108 has two access openings 112 that align with the two entrance openings 114 in the tunnel module 106 as shown. The base 108 may also includes inner ribs or alignment structures (not shown) to help position and secure the inner component modules to prevent sliding or shifting thereof within the outer housing.

The outer housing 102 protects the inner trap components, i.e., the electronics module 104 and the tunnel module 106, making the trap more resistant to possibly damaging conditions in the environment or associated with handling of the trap, while the modular design allows these inner components or modules to be removed and replaced separately by opening the lid of the outer housing. The lid 110 of the outer housing 102 is also preferably provided with a safety switch (not shown) that prevents the trap from being activated when the lid is open.

Figure 12:
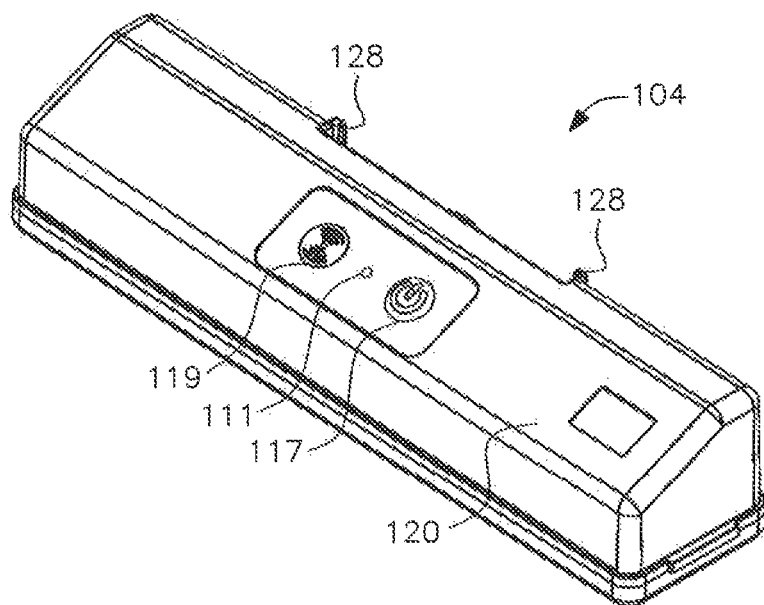
FIG. 12 is an isolated perspective view of the electronics module of the trap shown in FIG. 9 showing a power-on button, a wireless connection indicator and an LED power indicator.
Figure 13:
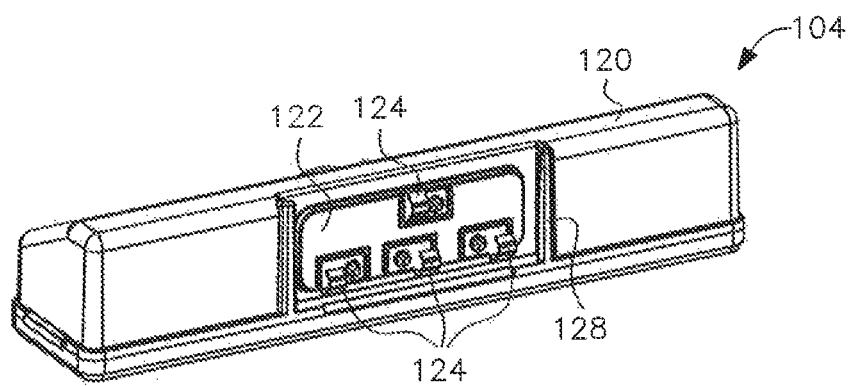
FIG. 13 is another perspective view of the electronics module shown in FIG. 12, showing the electrical contacts on the inner side wall of the electronics module housing.

As shown in FIGS. 12 and 13, the removable electronics module 104 includes a waterproof electronics housing 120 that contains the high voltage circuitry used to power the killing plates that are positioned in the tunnel module 106. An outer wall 122 of the electronics housing is provided with electrical contacts 124 that are brought into active engagement with corresponding contacts 126 on the tunnel module 106 (see FIG. 14). The contacts 126 on the tunnel module 106 are coupled to the killing plates inside the killing chamber when the trap is fully assembled. The outer wall 122 of the electronics housing 120 is also provided with flanges 128 that align with and slide into projecting channels 130 on the outer wall of the tunnel module to secure the housing 120 to the tunnel module and keep the contacts 124, 126 in firm connection when the trap is in use (see FIGS. 22A-22C for the inner component removal sequence). The outer wall 122 of the electronics housing 120 preferably includes a power-on button 117, an LED power indicator 111 and a trap wireless connection indicator 119.

Figure 14:
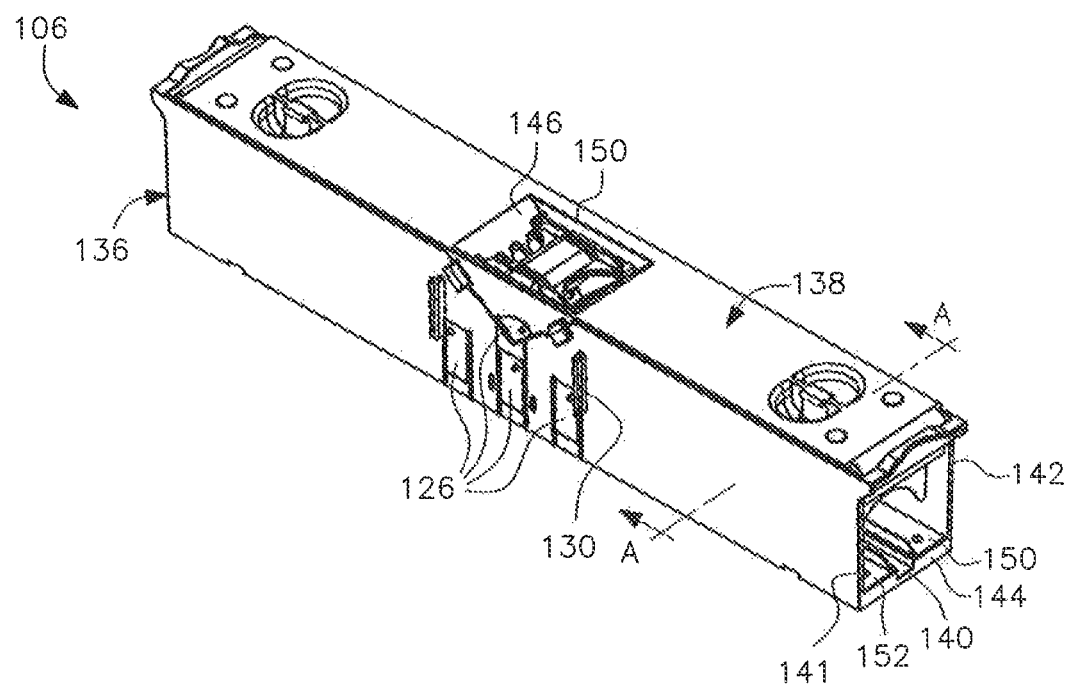
FIG. 14 is an isolated perspective view of the tunnel module of the trap shown in FIG. 9, showing the electrical contacts that mate with the electrical contacts on the electronics module shown in FIG. 13.
Figure 15A:
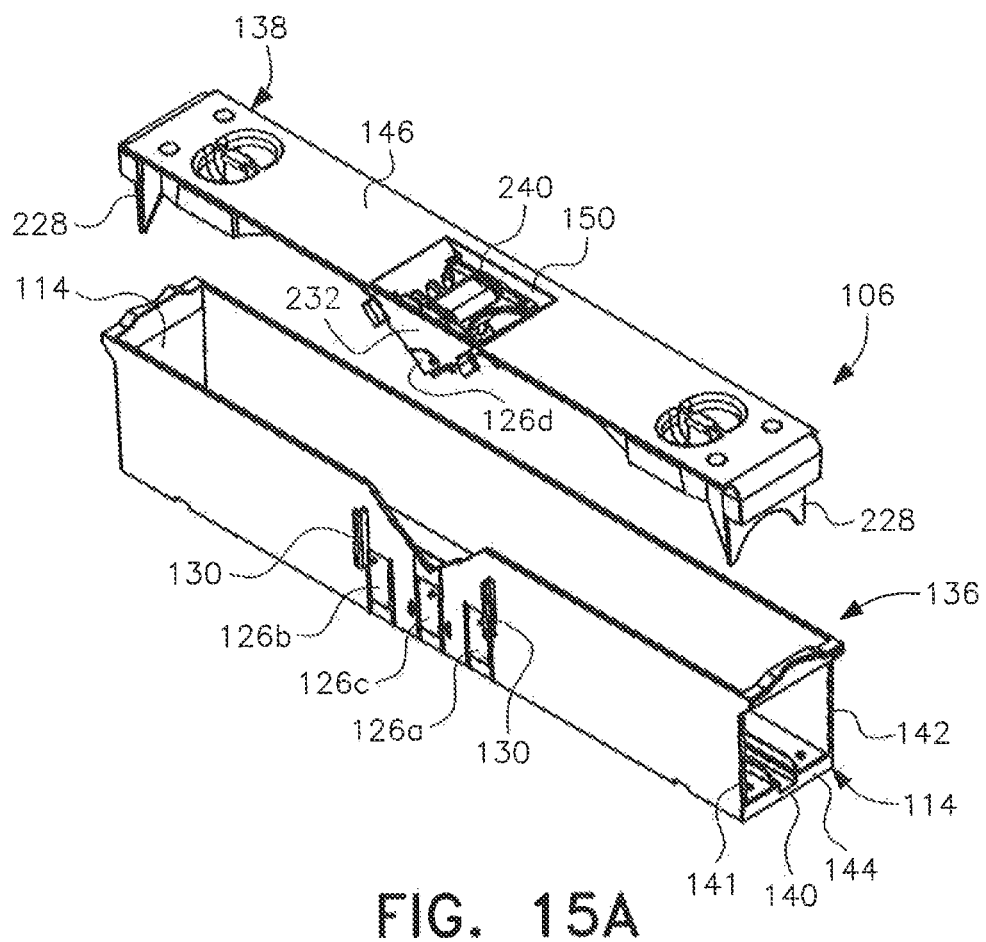
FIG. 15A is an exploded perspective view of the tunnel module shown in FIG. 14.
Figure 15B:
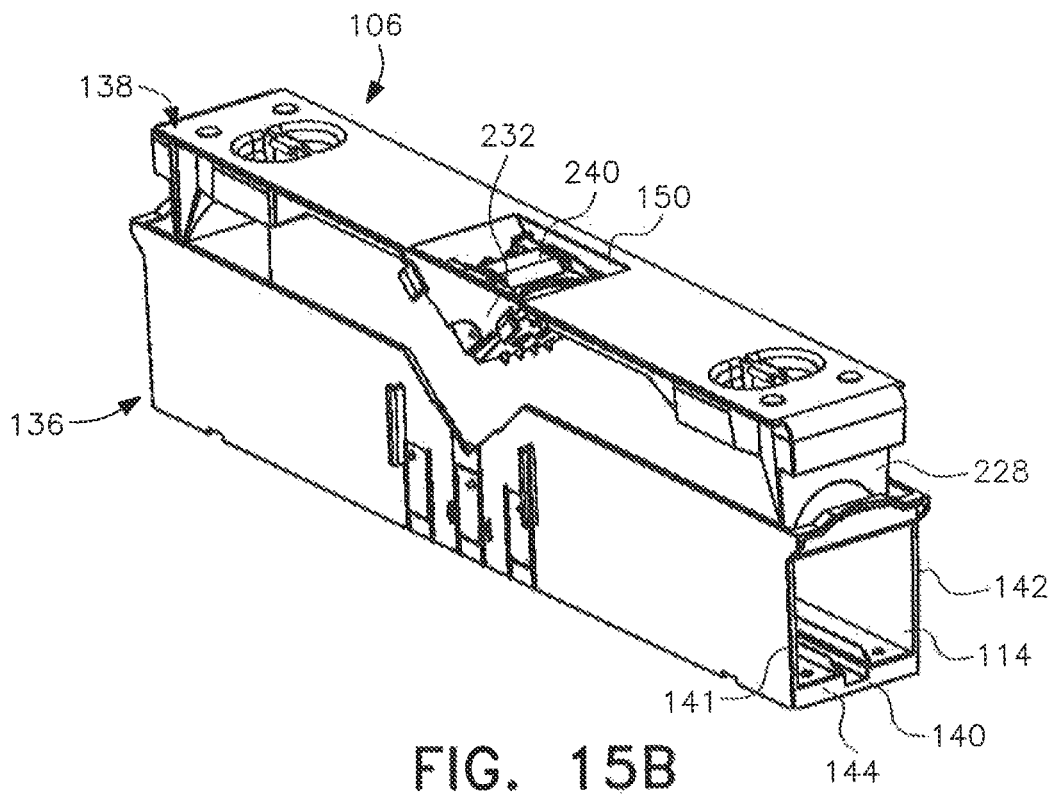
FIG. 15B shows the cover plate of the tunnel module in the process of being nested within the tunnel base of the tunnel module shown in FIG. 15A.
Figure 16:
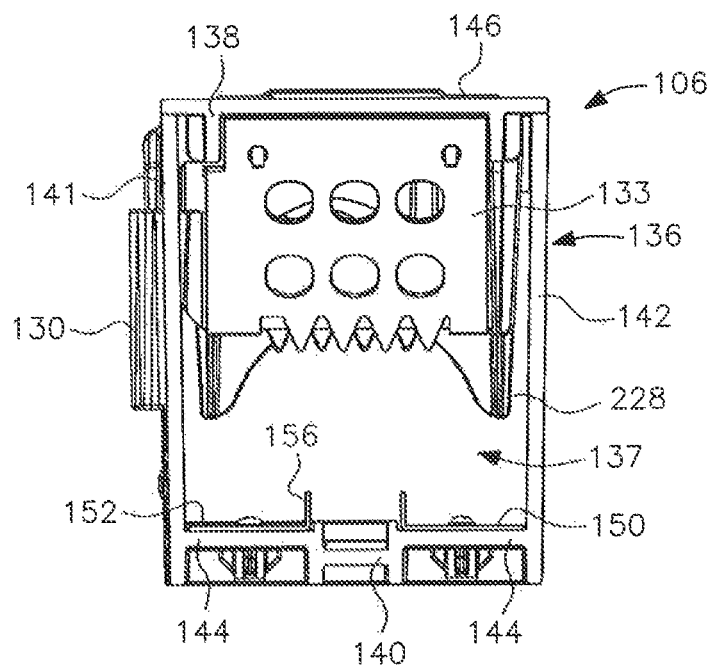
FIG. 16 is an end view taken along line A-A of FIG. 14.

The tunnel module 106 as assembled is shown in FIG. 14 and includes a tunnel base generally designated by reference numeral 136 and a removable cover panel generally designated by reference numeral 138. FIG. 15A is an exploded view of the tunnel base 136 and cover panel 138, while FIG. 15B shows the cover panel being put in place. The tunnel base 136 and cover panel 138 together form the tunnel module that defines the killing chamber generally designated by reference numeral 137 (see FIG. 16).

The tunnel base 136 includes a floor 140 and two side walls 141, 142 extending between the opposed entrance openings 114. Alternatively, the cover panel could be constructed with the two side walls so as to fit onto the floor of the base. As shown, the contacts 126 are on side wall 141. The lower plates 150, 152 are positioned adjacent the floor 140 of the tunnel base, and are preferably on elevated tracks 144 above the floor, as has already been described. The entry baffles 228 and the center baffle 232 with the third plate 133 (see FIG. 16) project from the inner or lower side of the cover panel 138 to extend downwardly into the killing chamber 137 when the cover panel 138 is secured to the tunnel base 136. As shown, the third plate 133 may be provided with a jagged or uneven lower edge. While not necessary, the jagged or toothed lower edge reduces the ability of the rodent to go under the baffle and plate without activating the trap as the teeth more readily get past the rodent's fur to make contact with its body. The outer or upper side 146 of the cover panel 138 includes an opening 150 into the center baffle 232 for receiving the bait cup 240.

Figure 17:
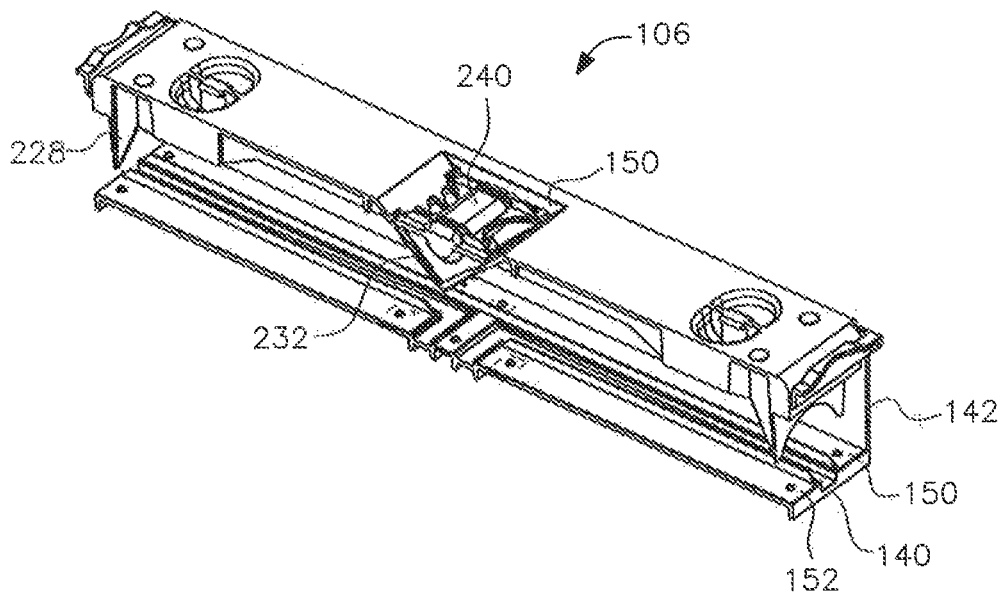
FIG. 17 is an upper perspective view of the tunnel module shown in FIG. 14 with the side wall that faces the electronics module having been removed.
Figure 18:
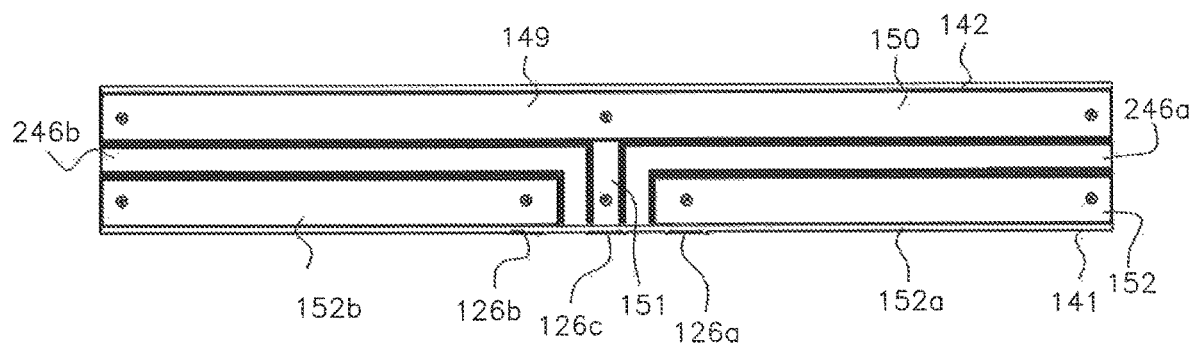
FIG. 18 is a top view of the lower killing plates of the tunnel module shown in FIG. 17.
Figure 19:
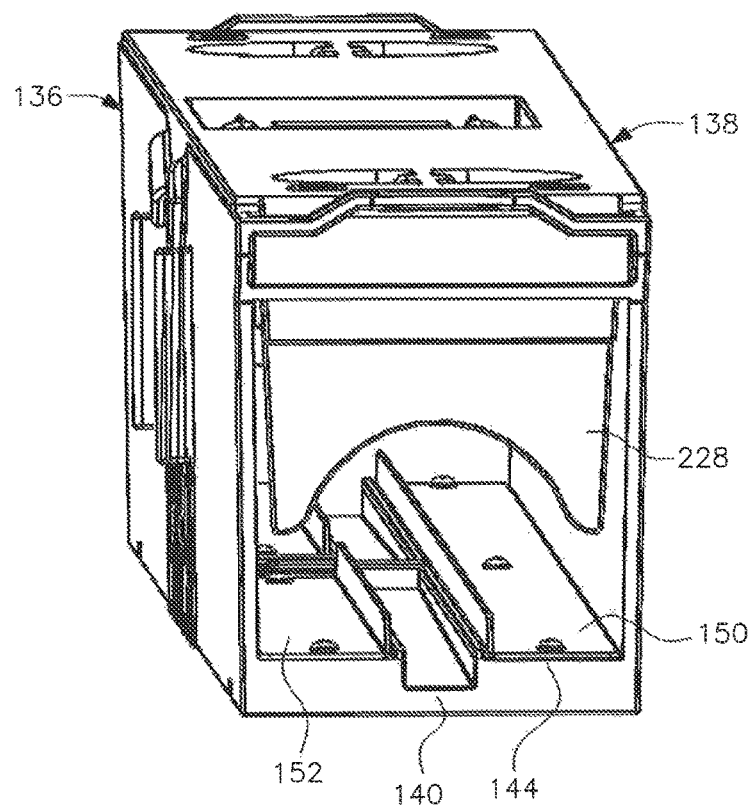
FIG. 19 is a perspective end view of the tunnel module shown in FIG. 14.
Figure 20:
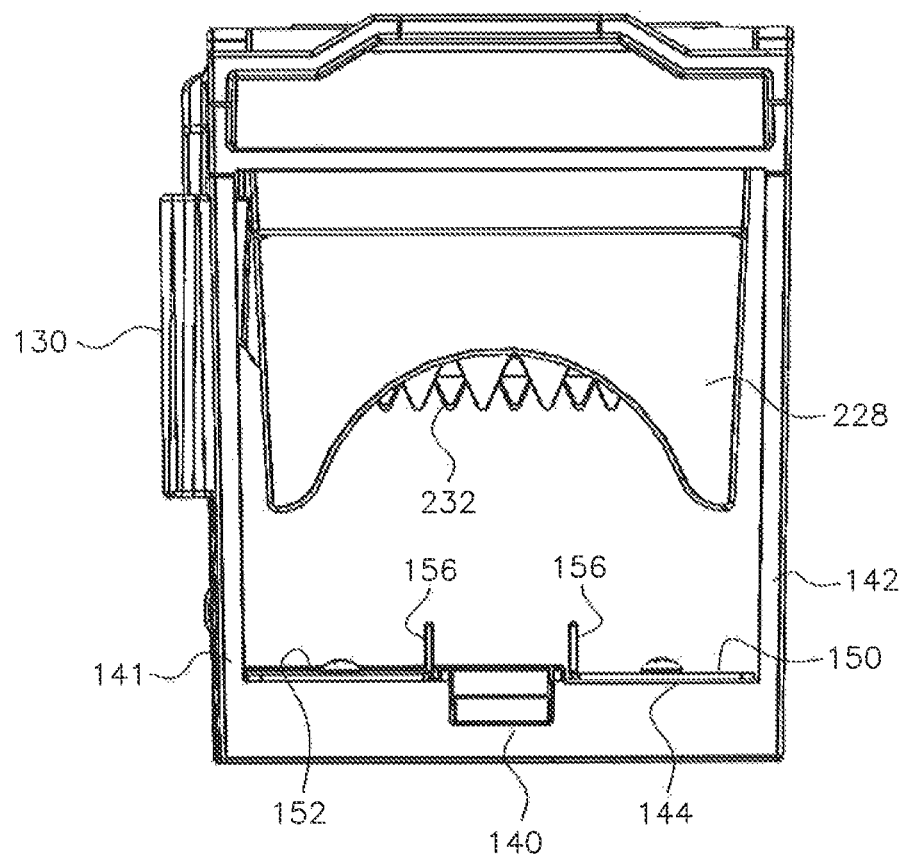
FIG. 20 is an end view of the tunnel module shown in FIG. 19.

FIGS. 17-19 show the arrangement of the lower plates 150, 152 in the modular configuration illustrated herein. Plate 150 is T-shaped, having a long side 149 adjacent to and parallel with side wall 142 and a perpendicular stem 151 extending transverse to the longitudinal length of the trap and electrically coupled through side wall 141 to the electronics module 104. Plate 152 is made of two short plates 152a, 152b positioned adjacent side wall 141. The short plates 152a, 152b are electrically connected to one another inside the electronics module 104. As best seen in FIG. 18, short plates 152a, 152b are connected with contacts 126a, 126b, respectively, while the perpendicular stem 151 of plate 150 is connected with contact 126c. The third plate 133 on the center baffle 232 is coupled to the upper contact 126d (see FIG. 15A).

Plates 150, 152 are separated by channels 246a, 246b in like manner to the separation provided by channel 46 between plates 50, 52 as previously described herein. In addition, the plates 150, 152 are preferably bent at about 90.degree. with a planar portion lying flat on the raised tracks 144 and an upwardly directed edge portion 156 as in the embodiment already described in connection with FIGS. 1-8.

Figure 21A:
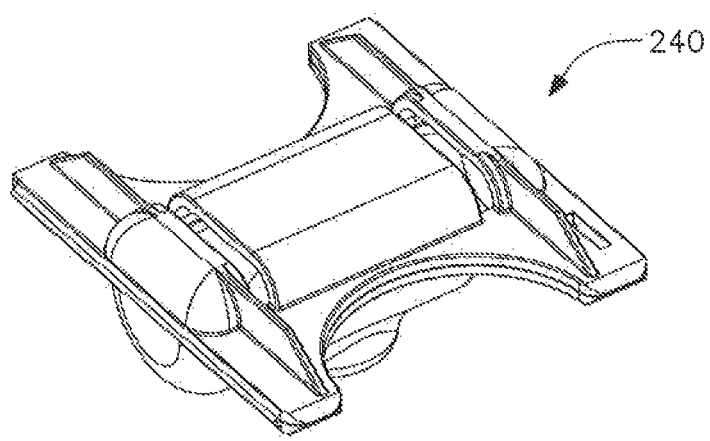
FIG. 21A is a perspective view of the bait cup used with the tunnel module shown in FIG. 14.
Figure 21B:
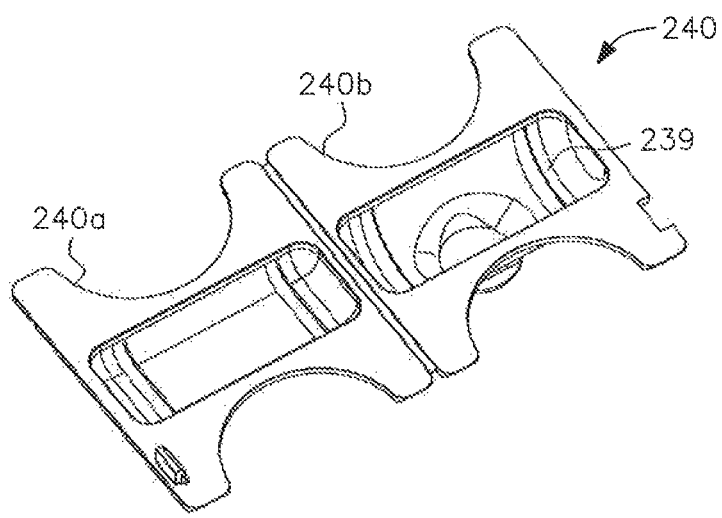
FIG. 21B is an upper perspective view of the bait cup shown in FIG. 21A but as opened to place bait therein.
Figure 21C:
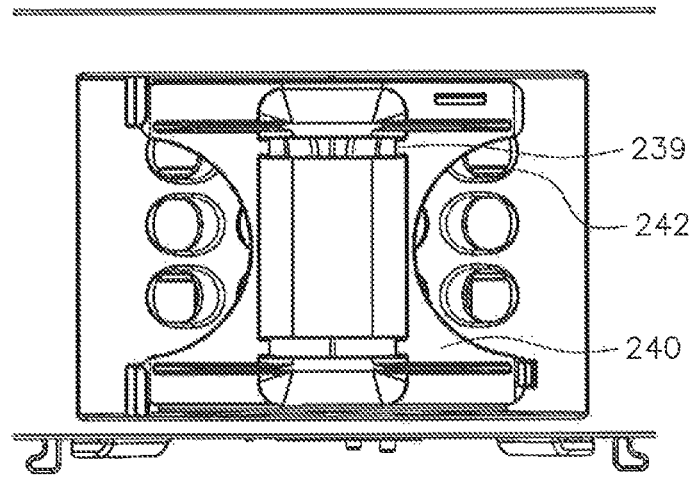
FIG. 21C is a top view of the bait cup mounted in the opening in the cover panel of the tunnel assembly shown in FIG. 14.

A bait cup 240 to be received in the opening 150 in the center baffle 232 is shown in FIG. 21A and as positioned in the opening in FIG. 21C. The bait cup 240 may be made of two halves 240a, 240b that snap fit together as shown in FIG. 21B, but other designs are also possible. The two halves include vent slits 239 to allow for dispersal of scent from the bait while the center baffle also includes vent holes 242 as has already been described in connection with the embodiment shown in FIGS. 1-8.

As assembled, the electronics module 104 and the tunnel module 106 are fitted adjacent one another and enclosed within the outer housing 102. The electrical contacts 126 on the side wall 141 of the tunnel base 136 couple the killing plates 150, 152 to the contacts 124 on the electronics module housing 104. When the lid 110 of the outer housing 102 is closed, rodents may enter the killing chamber 137 through the aligned outer housing access openings 112 and tunnel module entrance openings 114 while the electronics module housing 120 keeps the high voltage circuit components safely isolated from rodent contact.

Figure 22A:
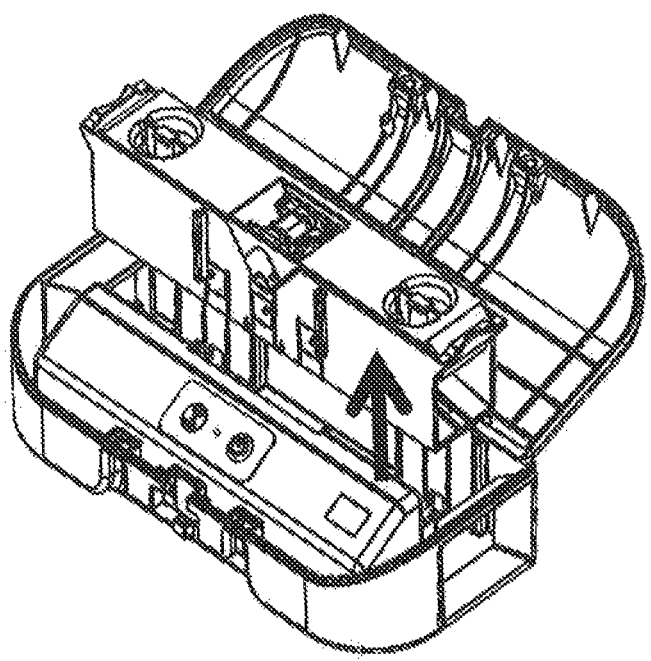
FIGS. 22A-22C are upper perspective views showing in three stages how to remove the tunnel assembly and electronics module of the modular electronic rodent trap shown in FIG. 9.

To disassemble the trap 100, the lid of the outer housing 102 is opened and the tunnel module 106 is pulled upwardly, disengaging the flanges 128 of the electronics housing 120 from the channels 130 on the tunnel module as shown in FIG. 22A. The electronics module 104 is then pushed toward the back wall of the housing 102 to align with the access openings 112, FIG. 22B, and lifted out, FIG. 22C.

Figure 23:
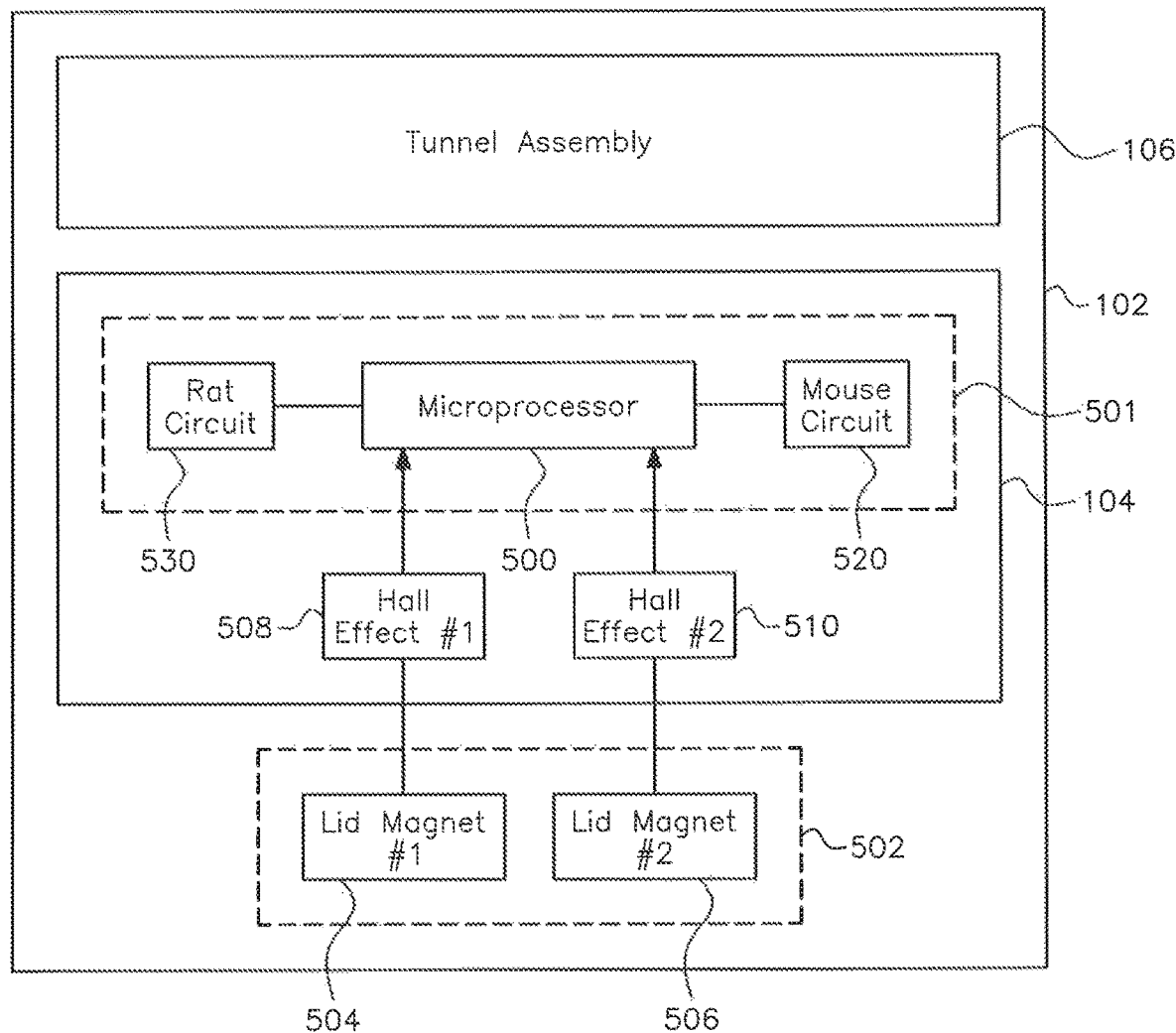
FIG. 23 is a block diagram of the modular electronic rodent trap including a safety switch for the outer housing lid that acts to configure the electronics module for operation as a mouse trap or as a rat trap depending on switch contact engagement.

While the plates are enclosed within the tunnel module 106 making inadvertent user contact therewith unlikely, the electronics module is preferably operative with a safety switch 502, depicted in the block diagram of FIG. 23, to ensure that a microprocessor 500 in the electronics module 104 will not activate the high voltage circuit 501 unless an input is sensed indicating that the lid of the outer housing 102 is closed. To increase the modularity of the trap, the safety switch 502 according to the present invention is configured to include two possible contact closures which may be represented by first and second lid magnets 504, 506, which are in communication with first and second Hall-effect devices 508, 510, respectively. Depending upon which magnet is engaged when the lid 110 of the outer housing 102 is closed, the safety switch 502 is operative to communicate with the microprocessor 500 via the respective Hall-effect device which configures the high voltage circuit 501 for operation using either the mouse circuit 520 or the rat circuit 530 portions of the high voltage circuit 501. Thus, when magnet 504 is contacted upon closure of the lid 110 of the outer housing 102, its associated Hall-effect device 508 is activated and tells the microprocessor 500 to activate the rat circuit 530. Conversely, when magnet 506 is contacted upon lid closure to activate Hall-effect device 510, the microprocessor 500 proceeds to activate the mouse circuit 520. In this way, mouse and rat trap versions of the electronic rodent trap according to the present invention as described herein, which have different dimensions in the tunnel assembly and overall trap footprint, may utilize a common electronics assembly 104 with both modes of operation being available, dependent upon the magnet closure engagement of the safety switch 502. With this modularity, the user can power both kinds of traps with the same electronics assembly 104, with reduced equipment costs and increased utilization of assets.

While illustrated with all of the features as just described, the present invention is also directed to any electronic rodent trap that includes the combination of a pair of spaced killing plates arranged substantially parallel with one another near the floor and extending along the longitudinal dimension of the trap and a third plate in an elevated position above the floor of the trap, with the third plate being the trigger plate. The elevated positioning of the third plate, and the requirement that both the lower plates and the upper plate be contacted to trigger the trap, may be used effectively with traps having shapes other than that of a tunnel, with traps having only a single door, with traps in which the lower plates are not raised above the floor or with traps that do not have a center baffle and/or entry baffles.

As has been described, it is preferable that the lower plates are bent at about 90.degree. with a planar portion lying flat on the raised tracks and an upwardly directed edge portion. The bent shape of the lower plates increases contact with the rodent, particularly when the trap is provided with entry baffles that force the rodent into contact with the upwardly bent edges of the lower plates with the baffles being positioned to contact the rodent in the mid-back when the rodent triggers the trap.

In addition, while a configuration in which the upper plate is part of a center baffle is preferable, the upper plate may be positioned alone, such as directly on the ceiling or on the side of the trap. If on the side of the trap, the upper plate should be spaced above the floor such as, for example, halfway up the side wall or higher. It is not expected that the rodent will remain in contact with the upper plate after triggering the trap, but will rather be dispatched by the activated lower plates. Therefore, the upper plate may be at various positions within the trap so long as sufficiently spaced above the lower plates to avoid triggering of the trap by water contacting the upper and lower plates simultaneously or by insects that, while crawling into the trap on the floor or on another surface, are typically not large enough to span a gap and contact two spaced surfaces at once.

While the modular configuration with parallel, longitudinally extending, killing plates as described herein is preferred, those skilled in the art will readily appreciate that the modular trap design disclosed herein, having separate electronics and tunnel modules with mating electrical contacts within an outer housing, could include tunnel modules in which the killing plates are arranged in series as shown in the '899, '466, and '657 patents. Therefore, the module design features of the present invention are to be understood as not being limited to electronic rodent traps having a parallel plate arrangement in the tunnel module.

Accordingly, the present invention may be directed to a modular electronic rodent trap including an outer housing that receives a removable electronics module and a removable killing chamber module having at least one entrance opening. The outer housing is provided with an access opening that aligns with the killing chamber module entrance opening when the trap is assembled with the two modules inside the outer housing.

The electronics module includes a waterproof or water resistant electronics housing that contains a power source and high voltage circuitry used to energize a plurality of killing plates, which may be in varying configurations, that are positioned in the killing chamber module. Electrical contacts on an outer wall of the electronics module housing are brought into mating engagement with electrical contacts on the outer wall of the killing chamber module to connect the power source and the high voltage circuitry in the electronics module with the killing plates in the killing chamber module when the trap is fully assembled with the outer housing protecting the inner modules.

Further, the present invention is intended to include any electronic rodent trap having a pair of spaced, substantially parallel plates extending longitudinally, i.e., perpendicular to the trap entrance, that are triggered by a separate triggering element positioned in an elevated position within the killing chamber of the trap. This triggering element may be a third plate or, alternatively, may be a mechanical switch as in U.S. Pat. No. 7,690,147 ("the '147 patent"), or an infrared sensor as in U.S. Pat. No. 7,757,430 ("the '430 patent"), or any other known sensor as would be considered suitable by persons skilled in the art. The complete disclosures of the '147 patent and the '430 patent are also hereby expressly incorporated by reference herein as if fully set forth in their entirety.

Accordingly, the present invention may be directed to an electronic rodent trap having a trap body with a killing chamber accessed by an entrance opening and including a plurality of killing plates and an elevated triggering or sensing element. The plurality of killing plates includes at least two oppositely charged lower plates positioned adjacent a floor of the killing chamber and oriented substantially in parallel with one another, having at least portions thereof that extend longitudinally like train tracks oriented perpendicular to the entrance opening so that the rodent contacts one plate with its left feet and the other substantially parallel plate with its right feet, the longitudinally extending portions of the lower plates being separated from one another by a longitudinally extending channel. The elevated triggering element is spaced above the floor and inwardly from the trap entrance opening, with activation of the high voltage circuitry being triggered when the rodent contacts the triggering element, such as with its nose, while standing with its left and right feet on the left and right lower parallel plates, respectively. The triggering element may be a third charged plate as has been disclosed herein, or may be a mechanical switch, IR sensor or the like, as would be known by skilled persons in the field of rodent traps as suitable for use in an electronic rodent trap.

Figure 24:
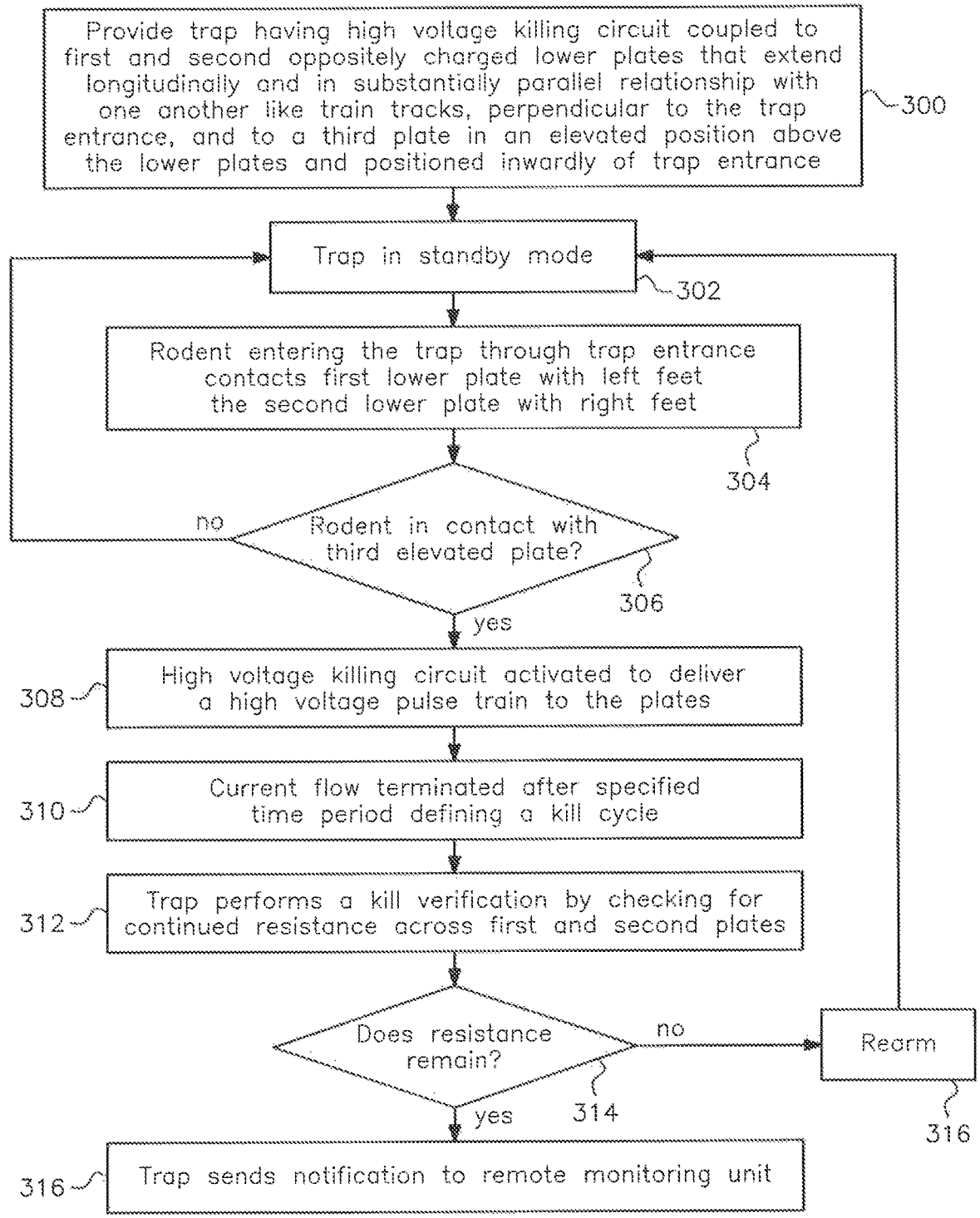
FIG. 24 is a flow chart of a method of operating and monitoring electronic rodent traps of the types disclosed herein in accordance with the present invention.

Further, the present invention includes a method of using and/or operating an electronic rodent trap of the types disclosed herein as summarized in FIG. 24. The method includes providing an electronic rodent trap having a trap body with at least one entrance, a high voltage killing circuit coupled to first and second oppositely charged lower plates that extend longitudinally and in substantially parallel relationship with one another like train tracks, perpendicular to the trap entrance, and to a sensing or triggering element, such as a third plate, in an elevated position above the lower plates and positioned inwardly of the entrance, step 300. Place the trap in active standby mode by powering trap, step 302. With trap in active standby, a rodent entering the trap through the trap entrance contacts the first lower plate with at least one of its left feet and the second lower plate with at least one of its right feet, step 304. If the third plate is not contacted, step 306, the trap remains inactive and in standby mode. Upon the rodent making contact with the elevated sensing or triggering element, e.g., the third elevated plate, step 306, the high voltage killing circuit is automatically activated to deliver a high voltage pulse train to the first, second and third plates, step 308. Current flow is terminated after a specified time period defining a kill cycle, step 310, and the trap performs a kill verification by checking for continued resistance across the first and second plates, step 312. In the absence of resistance, step 314, the trap automatically rearms, step 316, and returns to standby mode, step 302. If resistance remains across the plates, step 314, the trap sends a notification to a remote monitoring unit that trap servicing is required, step 316. The elevated positioning of the third plate makes the method of operation more impervious to unwanted triggers and associated false notifications due to the presence of insects in the trap and/or water contamination. Additionally, to reduce the possibility of false notifications, such as due to the presence of water, the step of performing a kill verification is preferably performed after waiting for a time period following completion of the kill cycle to allow the water to drain from the lower plates.

The present invention is also directed to a method of monitoring a plurality of electronic rodent traps of the kind that has been described herein. The electronic rodent traps have remote monitoring capability substantially like that described in the '466 patent and the '657 patent, both previously incorporated by reference. According to the method, a trap that has been triggered determines, upon completion of the killing cycle and after waiting a time period, whether a resistance consistent with a dispatched rodent remains across the lower plates. In the absence of such resistance, the trap resets and awaits the next interaction. If the resistance is detected, however, the trap sends a transmission to a remote monitoring station of the triggered trap status and of the need for trap servicing. Such a method, which is summarized according to one embodiment in the '466 patent and according to another embodiment in the '657 patent, is enhanced by the raised lower plates which reduce the likelihood that a false trigger, due for example to the chance contact of water with both the upper and lower plates simultaneously, will be subsequently confirmed since the water will likely not remain so as to bridge the two lower plates at the time of trap status verification. As a result, the number of incorrect trap status notifications sent to the remote monitoring station will be reduced.

Should a flooding situation occur in which the water level in the room has risen to cover the lower plates, all of the user's traps on the same level would indicate the need for servicing at the same time. The pest controller would understand such an outcome as indicative of a problem beyond rodent control and could advise the owner of the facility in which the traps are deployed accordingly.

Figure 22B:
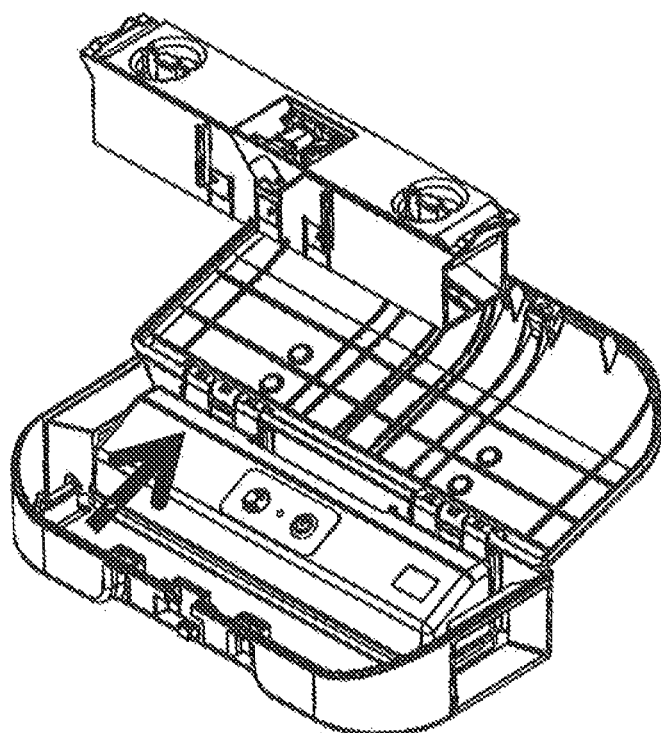
Figure 22C:
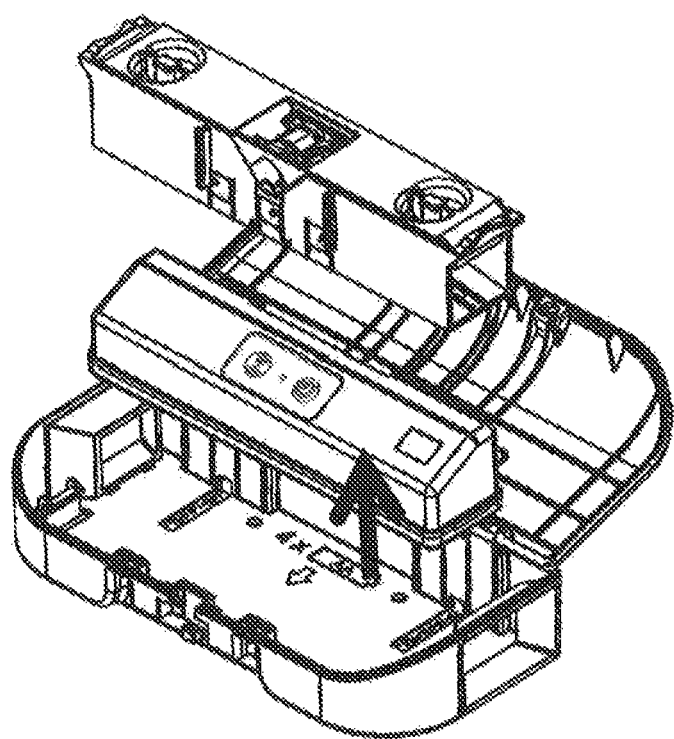

A method of assembly and disassembly of a modular electronic rodent trap is also provided as shown in FIGS. 22A-C.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An electronic rodent trap, comprising:
   a trap body having at least one trap entrance and extending longitudinally from the trap entrance to an opposite end; and
   a high voltage killing circuit operative within the trap body, the killing circuit including:
      a plurality of plates that includes two oppositely charged lower killing plates having at least portions thereof extending longitudinally within the trap body, the oppositely charged lower killing plates being spaced from one another by a longitudinally extending gap between the lower plates, and a triggering plate positioned above the two lower plates and spaced inwardly from the entrance; and
      a plurality of electrical contacts formed through the trap body and electrically connecting the plurality of plates to a remainder of the high voltage killing circuit, wherein the two oppositely charged lower killing plates include:
      a first plate having a first side that extends longitudinally through the trap body and a stem extending transverse to the first side, the stem being electrically coupled through a sidewall of the trap body to one of the electrical contacts on an exterior of the sidewall; and
      a second plate having two parts separated from one another within the trap body in a longitudinal direction by the stem of the first plate, each second plate being electrically coupled through the sidewall of the trap body to a respective one of the electrical contacts on the exterior of the sidewall.

2. The electronic rodent trap as set forth in claim 1, further comprising locking features defined on an exterior surface of the trap body and adapted to secure the trap body to an electronics housing containing the remainder of the high voltage killing circuit.

3. The electronic rodent trap as set forth in claim 2, wherein the locking features are positioned adjacent the plurality of electrical contacts.

4. The electronic rodent trap as set forth in claim 2, wherein the locking features comprise flanges formed on an outer sidewall of the trap body.

5. The electronic rodent trap as set forth in claim 1, wherein the triggering plate is formed integrally with a center baffle that extends downwardly into the trap body.

6. The electronic rodent trap as set forth in claim 5, wherein the center baffle defines a hollow interior for receiving bait, the center baffle including a plurality of scent openings formed therethrough.

7. The electronic rodent trap as set forth in claim 1, wherein the two oppositely charged lower killing plates are elevated above the floor of the trap body on raised tracks, the raised tracks being separated by a channel that forms the longitudinally extending gap separating the lower plates, the lower killing plates include a planar part lying substantially flat on the raised tracks and an upwardly directed bent part that is substantially perpendicular to the planar part, the bent part being adjacent the central channel and running substantially parallel therewith.

8. The electronic rodent trap as set forth in claim 1, further wherein the trigger plate defines a toothing facing downwardly toward the two oppositely charged lower killing plates.

9. An electronic rodent trap comprising:
a trap body having a floor, a pair of sidewalls and a ceiling defining a killing chamber;
a high voltage killing circuit including a plurality of plates that includes a pair of oppositely charged killing plates each having at least portions thereof extending from a trap entrance into the killing chamber;
a center baffle extending downwardly from the ceiling and into the killing chamber, the center baffle positioned directly above each of the pair of killing plates; and
a trigger sensor to sense the presence of a rodent positioned across the pair of killing plates to trigger the high voltage killing circuit to activate the pair of killing plates.

10. The electronic rodent trap as set forth in claim 9, wherein the ceiling defines a cover panel removably attached to the sidewalls, the center baffle extending downwardly from the removable cover panel and into the killing chamber with the cover installed onto a remainder of the trap body.

11. The electronic rodent trap as set forth in claim 10, further comprising a pair of entry baffles attached to either end of the removable cover panel, with the cover panel installed onto the remainder of the trap body, the entry baffles arranged at opposite ends of the killing chamber and extending downwardly into the killing chamber to create a height restriction.

12. The electronic rodent trap as set forth in claim 9, wherein the ceiling is fixedly attached to the sidewalls, the center baffle extending downwardly into the killing chamber from the ceiling and defining an open end arranged opposite the killing chamber for receiving bait within the center baffle.

13. The electronic rodent trap of claim 12, further comprising a lid removably attached to the trap body and selectively covering the ceiling including the open end of the center baffle.

14. The electronic rodent trap of claim 12, further comprising a pair of entry baffles attached to either end of the ceiling, each entry baffle extending downwardly from the ceiling toward the floor and having a generally semi-circular cutout that forms an arch-shaped lower edge.

15. A modular electronic rodent trap comprising:
an outer housing;
a removable tunnel module received within the outer housing, the tunnel module including a trap base and a cover panel, the trap base and cover panel defining a killing chamber having outer walls, a ceiling and a floor with at least one trap entrance, a longitudinal length of the killing chamber extending from the trap entrance to an opposite end; and
a removable electronics module received within the outer housing and positioned adjacent to the removable tunnel module, the electronics module selectively mechanically fixed and electrically connected to the removable tunnel module and containing high voltage circuitry operative with a plurality of killing plates positioned in the killing chamber, the plates are electrically coupled with tunnel module contacts on an outer surface of one of the killing chamber outer walls, the removable electronics module having an electronics housing with outer contacts configured for engagement with the tunnel module contacts to electrically couple the plates in the killing chamber with the high voltage circuitry in the electronics module.

16. The modular electronic rodent trap as set forth in claim 15, wherein in an installed position, the at least one entrance of the removable tunnel module is aligned in a longitudinal direction with a corresponding entrance opening defined by the trap body.

17. The modular electronic rodent trap as set forth in claim 16, wherein the electronics module is slidable within the outer housing between an installed position wherein the electronics module is laterally offset from the entrance opening of the trap body, and an installation and removal position wherein the electronics module is aligned in the longitudinal direction with the entrance opening of the trap body and removable from the trap body in a vertical direction.

18. The modular electronic rodent trap as set forth in claim 15, wherein the electronics module includes a microprocessor coupled to both a mouse circuit and a rat circuit, the outer housing having a lid equipped with a safety switch to prevent activation of the high voltage circuitry until the lid is closed, the safety switch including first and second closure engagements each having a respective input to the microprocessor, activation of the first closure engagement instructing the microprocessor to activate the rat circuit, activation of the second closure engagement instructing the microprocessor to activate the mouse circuit, whereby the same electronics module can be used to operate both mouse trap and rat trap versions of the electronic rodent trap through inputs from the safety switch.

19. The modular electronic rodent trap as set forth in claim 15, wherein the plates include:
a first plate having a first side that extends longitudinally through a body of the trap; and a second plate having two parts separated from one another within the trap body by the first plate.

20. The electronic rodent trap as set forth in claim 9, wherein the plurality of plates include:
a first plate having a first side that extends longitudinally through the trap body; and
a second plate having two parts separated from one another within the trap body by the first plate.

* * * * *